UNITED STATES PATENT OFFICE.

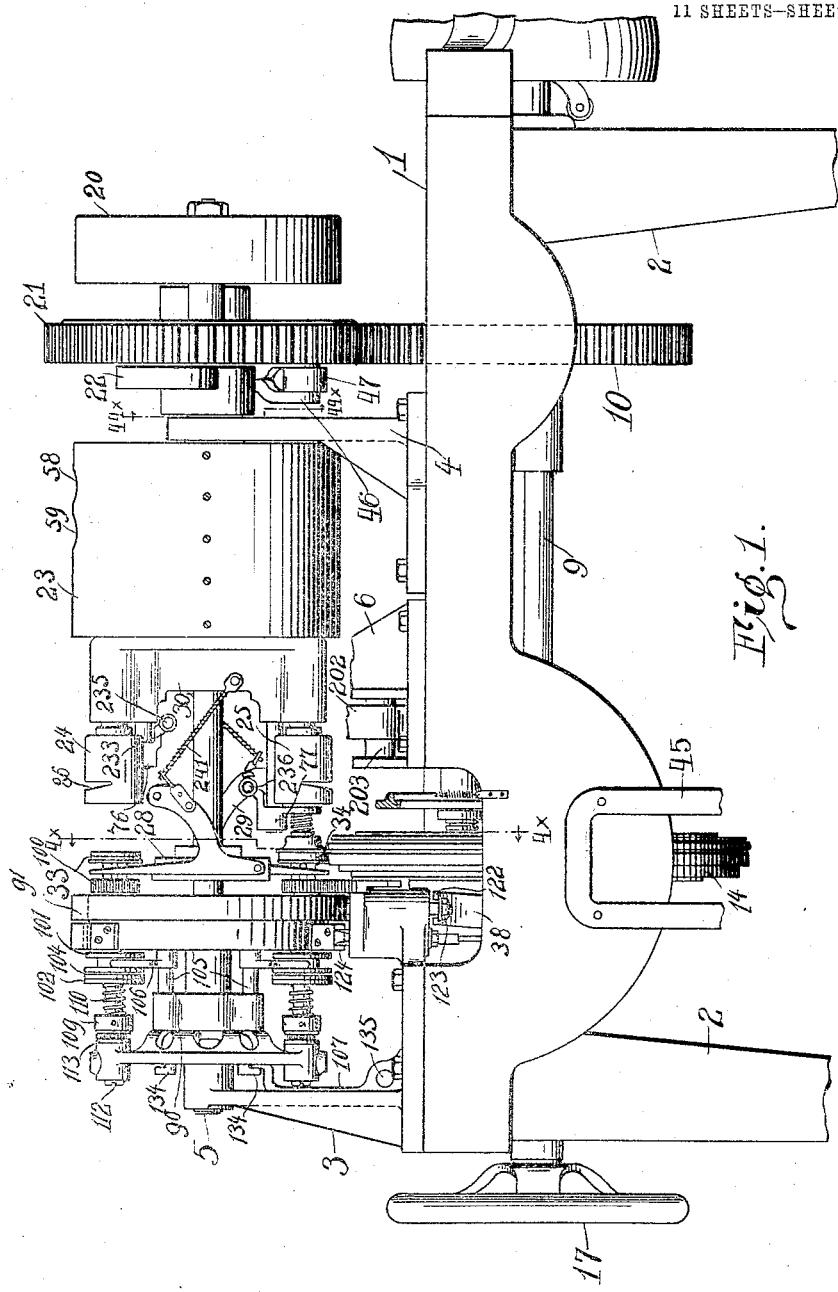

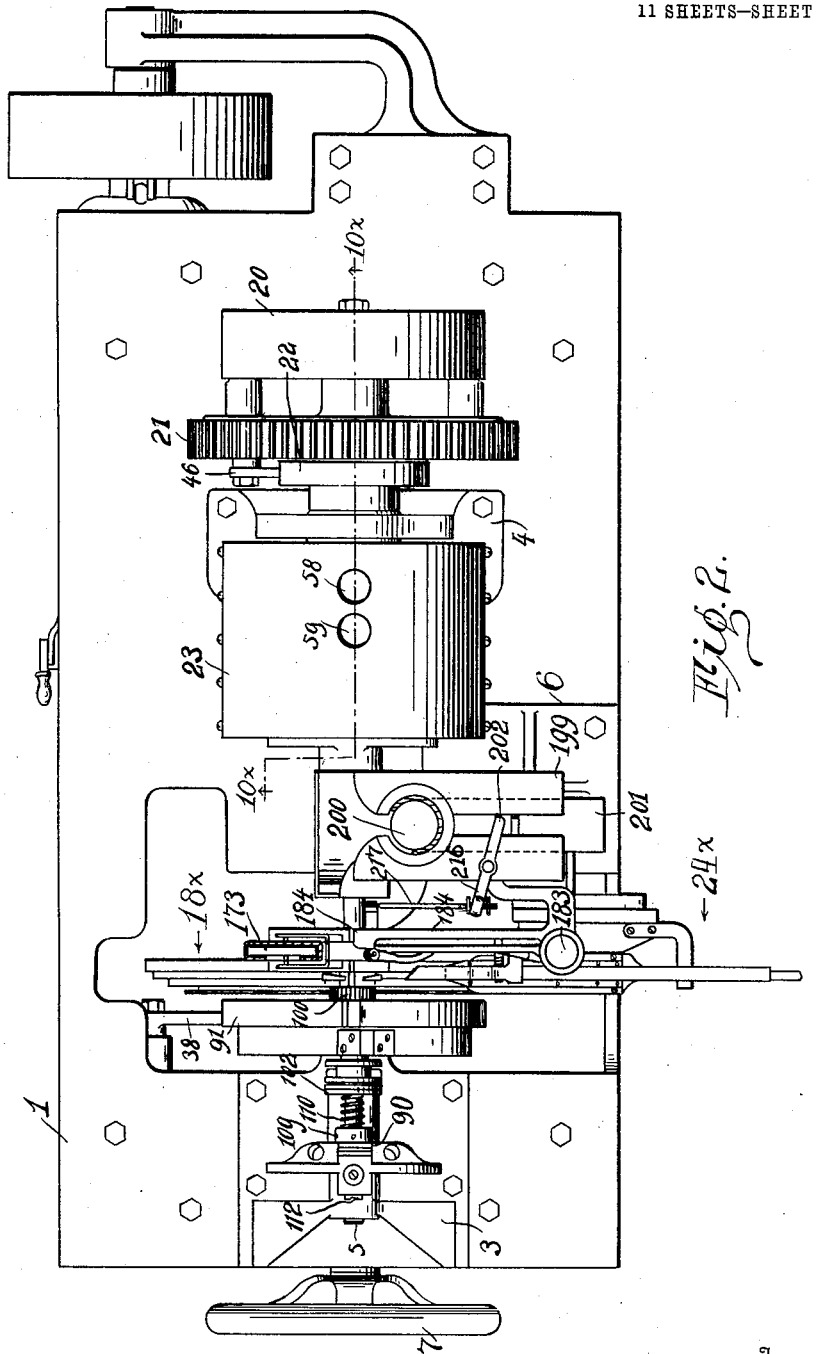

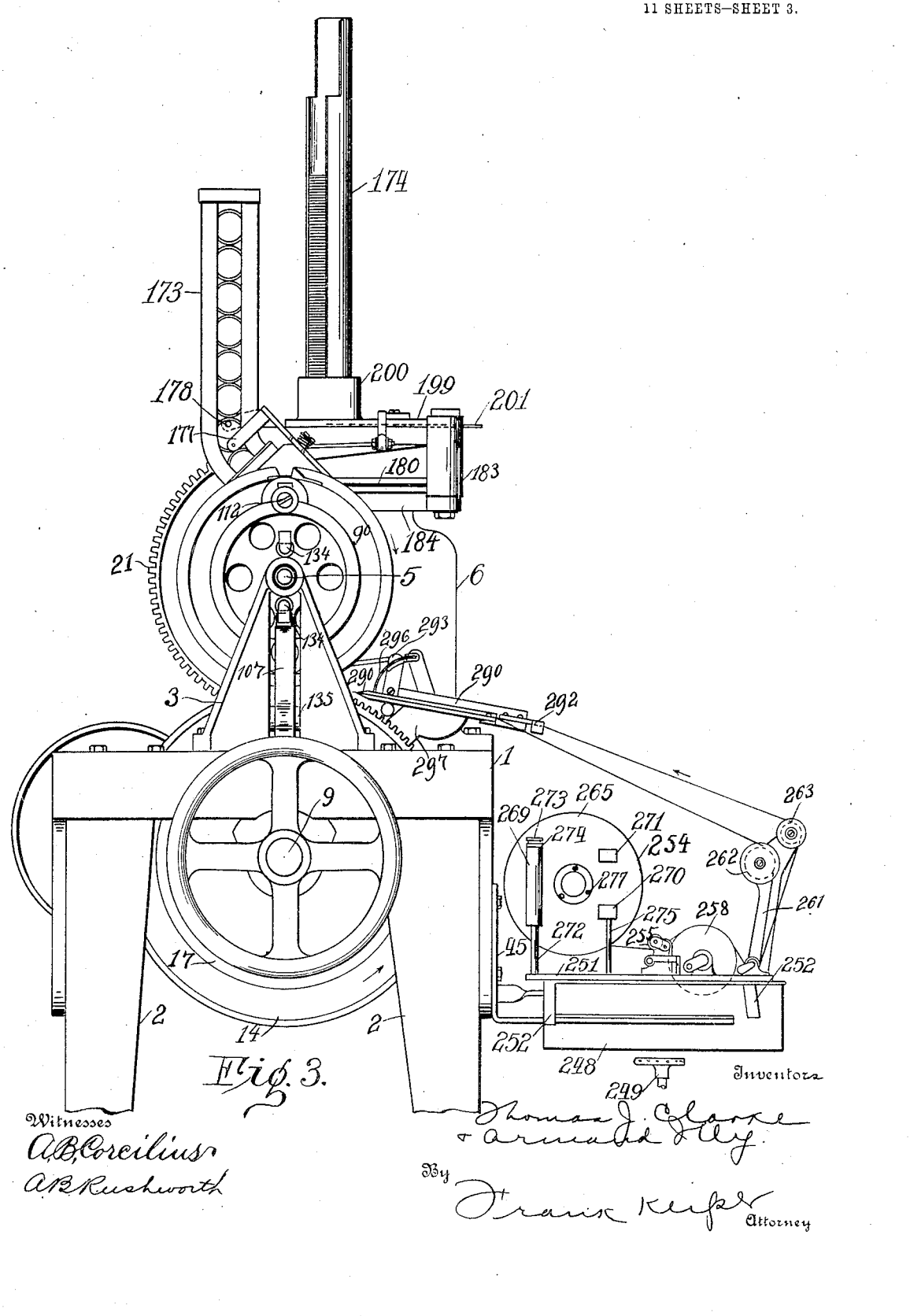

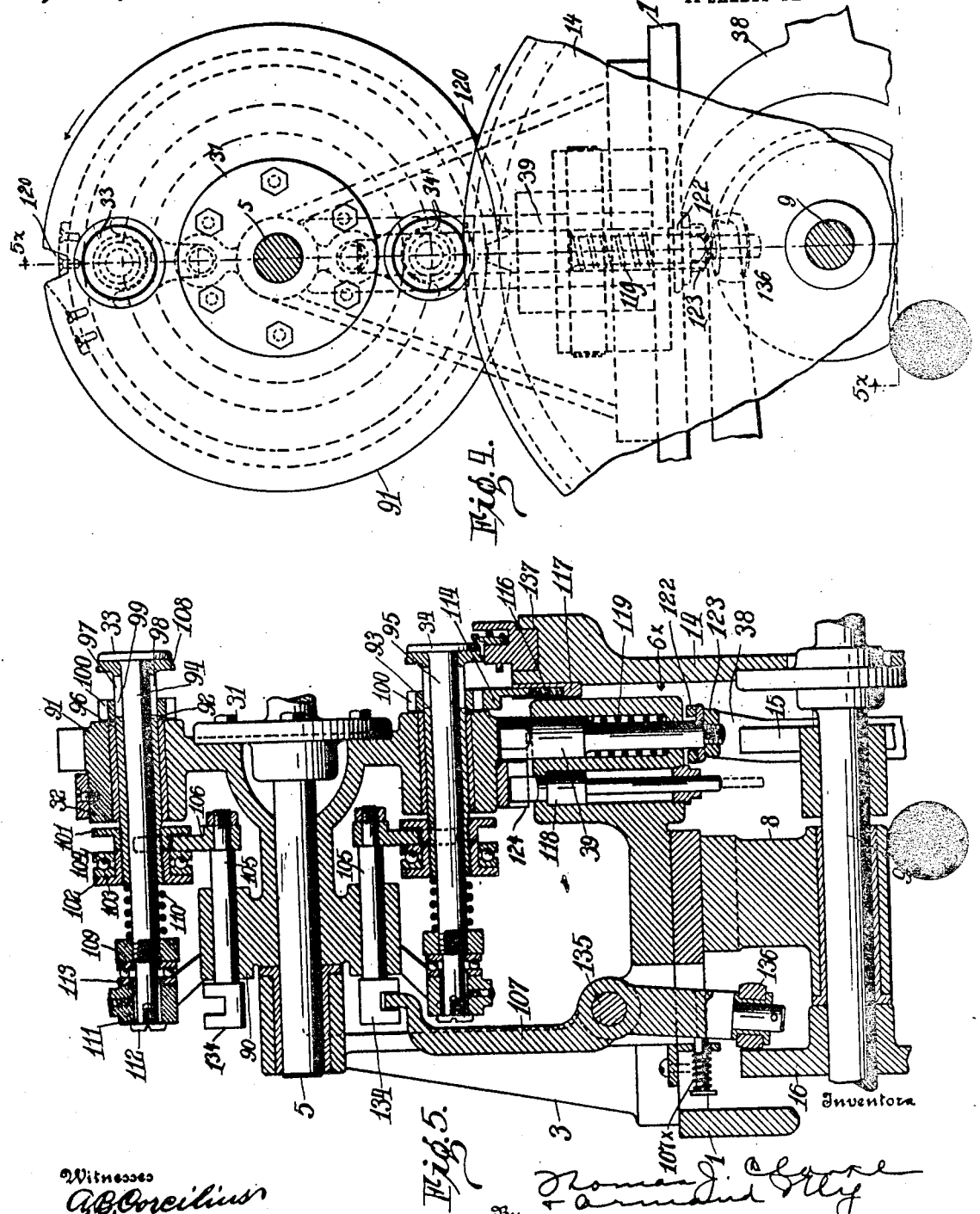

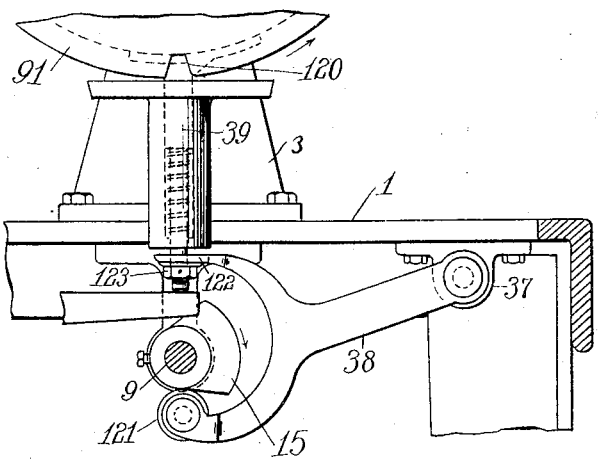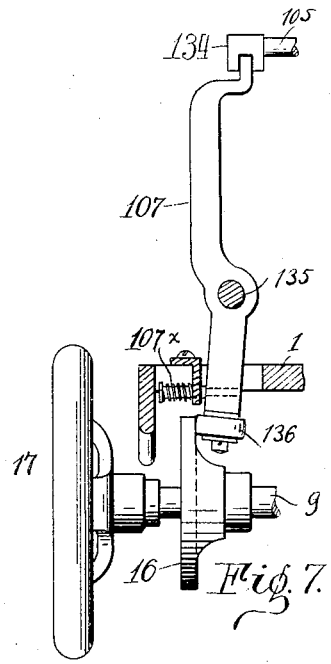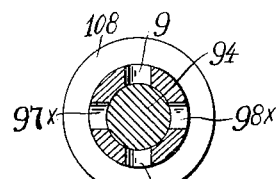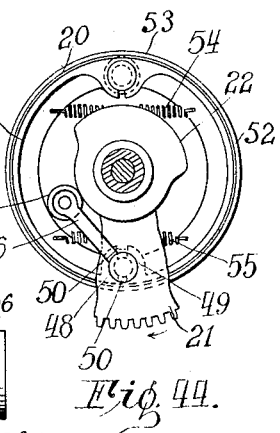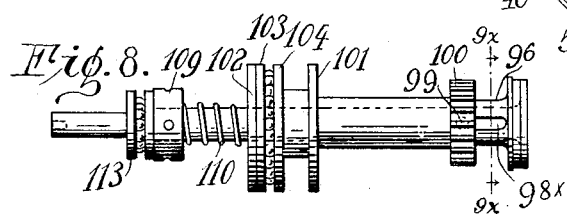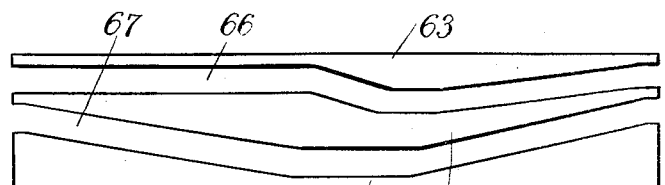

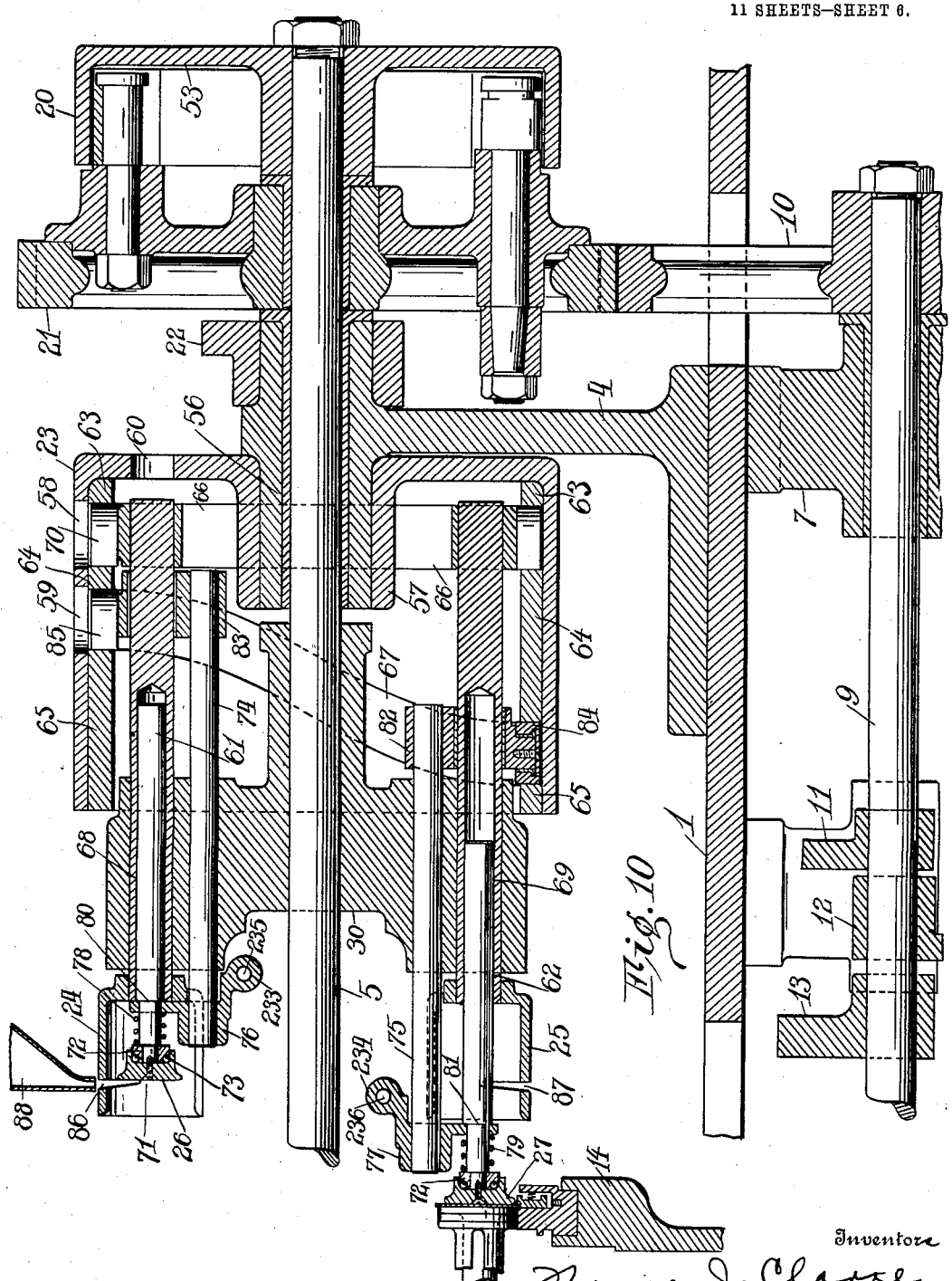

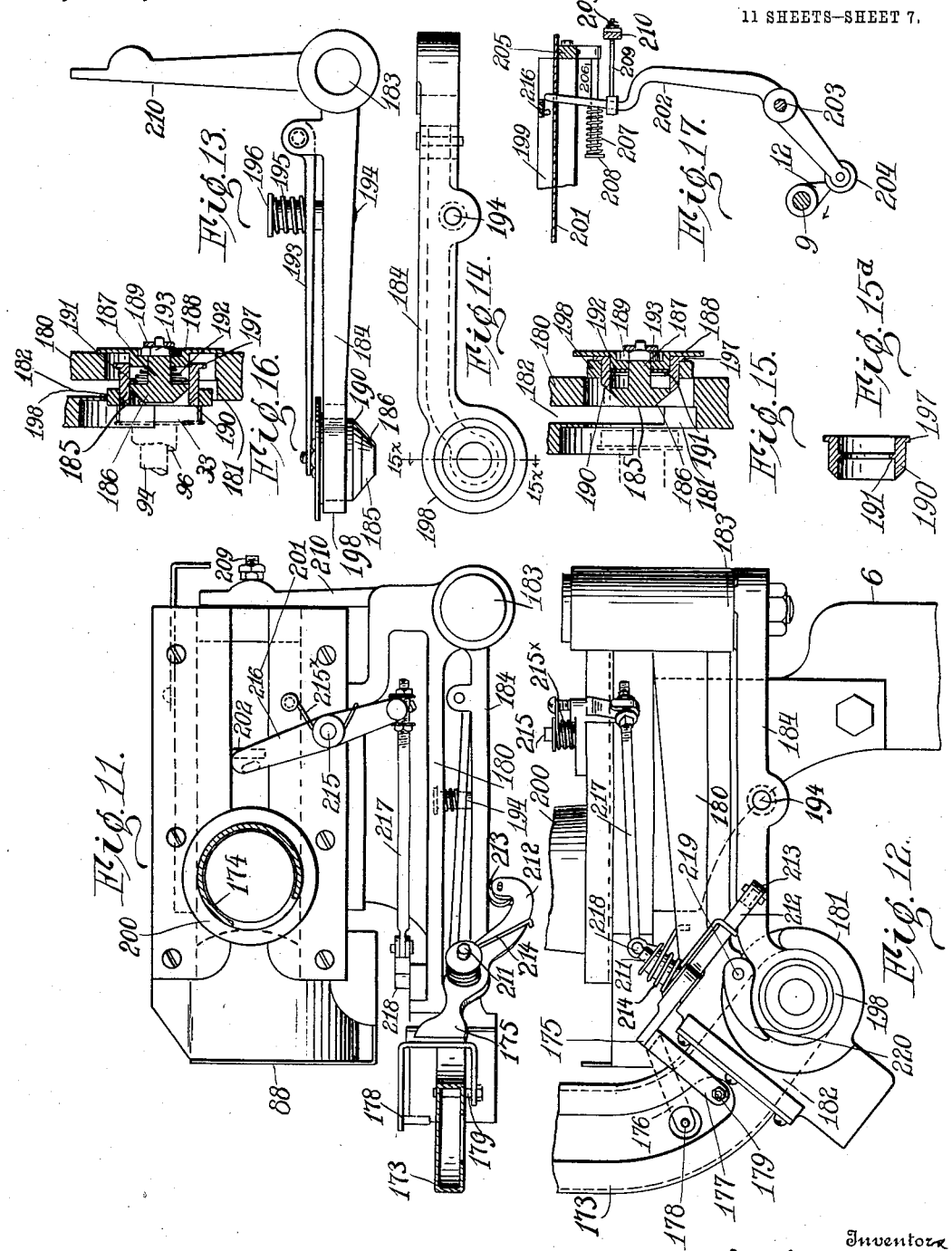

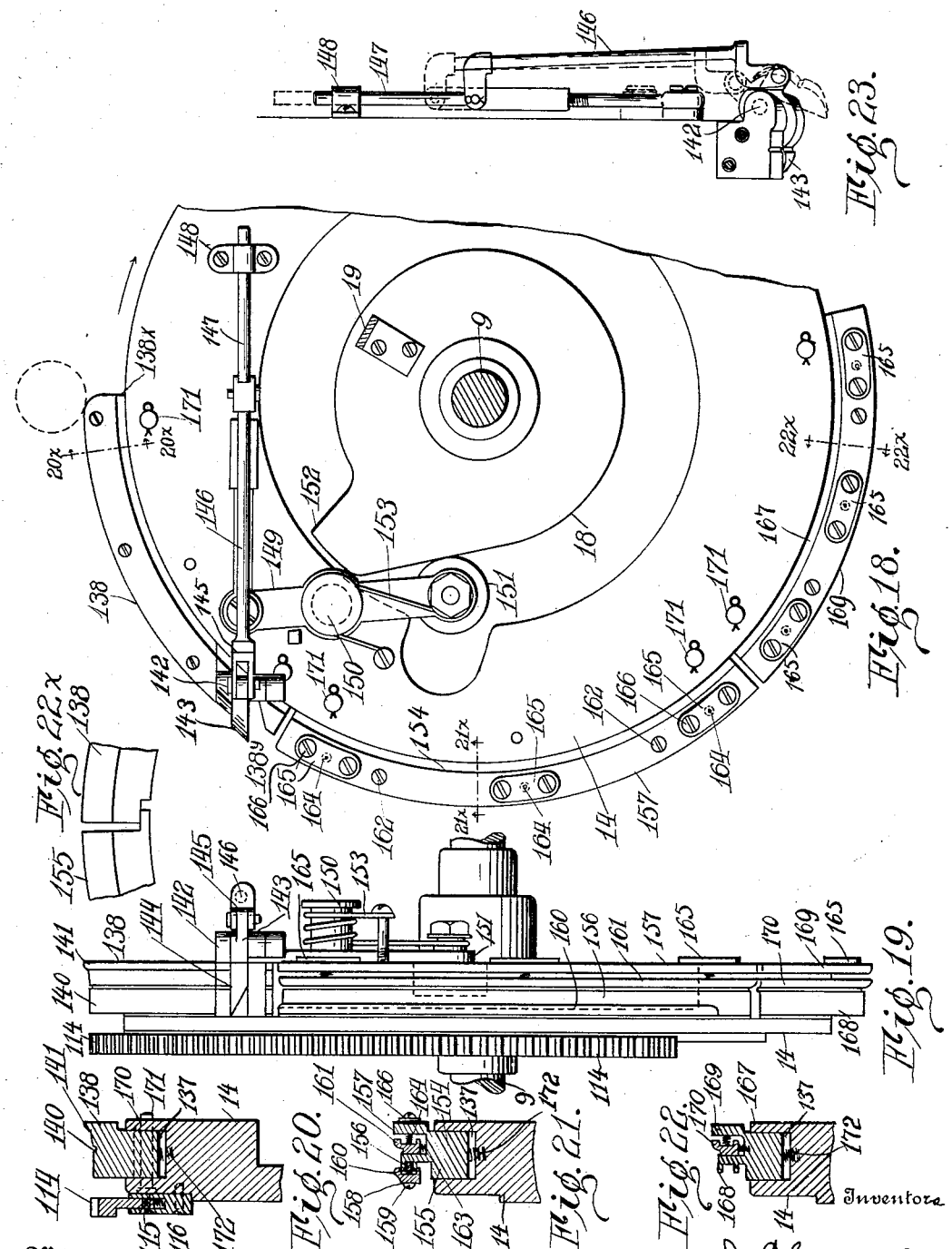

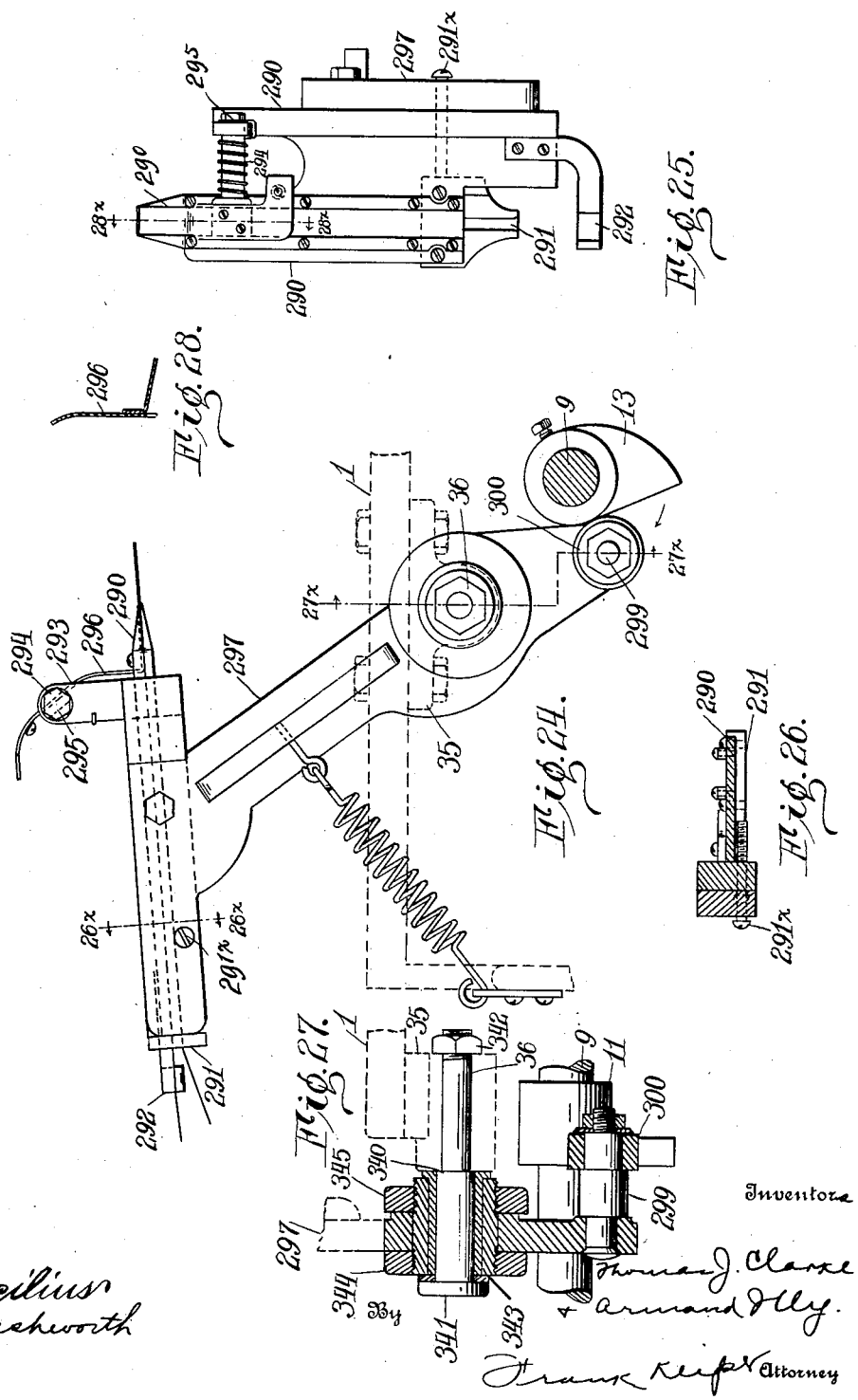

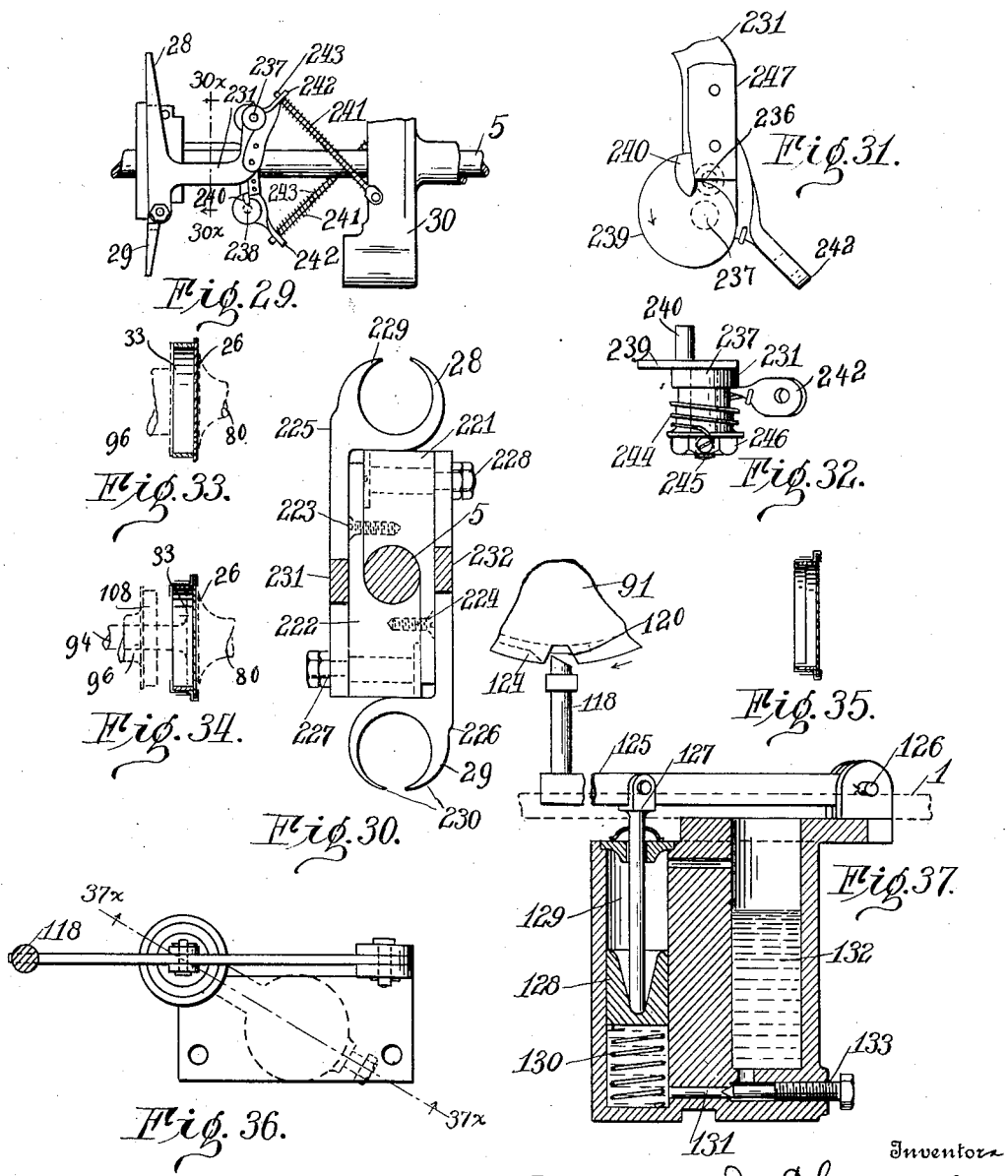

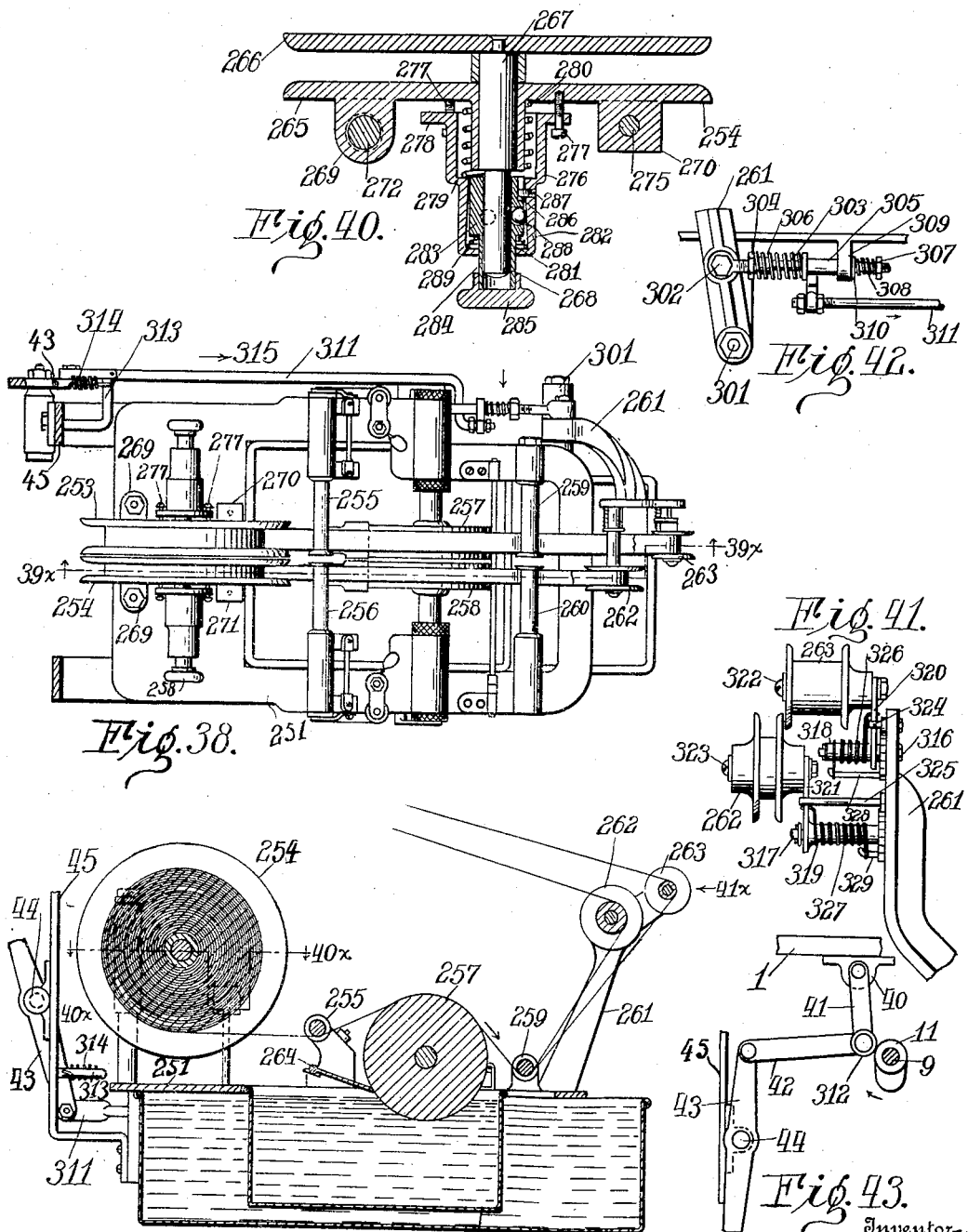

THOMAS JAMES CLARKE AND ARMAND ILLY, OF JAMESTOWN, NEW YORK, ASSIGNORS TO THE WILLIAM KOEHL COMPANY, OF JAMESTOWN, NEW YORK, A CORPORATION OF NEW YORK.

BOX-MAKING MACHINE.

1,098,314.  Specification of Letters Patent.  Patented May 26, 1914.

Application filed June 26, 1911. Serial No. 635,517.

*To all whom it may concern:*

Be it known that we, THOMAS JAMES CLARKE, a citizen of the United States, and ARMAND ILLY, a citizen of the Republic of Switzerland, residing at Jamestown, in the county of Chautauqua and State of New York, have invented certain new and useful Improvements in Box-Making Machines, of which the following is a specification.

The object of this invention is to produce a machine for making round pill boxes.

Another object of this invention is to form a round pill box of a separate ring and a head, made preferably of card board.

Another object of this invention is to construct a machine so as to automatically assemble the ring and head in proper position with relation to each other and to fasten them together by wrapping around them one or more strips of paper which have been covered with paste, thus joining the two parts together.

Another object of this invention is to provide a divided box form on which the box is assembled and which box form is capable of a variety of operations on said box.

Another object of this invention is to provide a forming wheel in the machine that will coöperate with the box forms to wrap the box and finish it.

Another object of this invention is to provide an improved mechanism for pasting and feeding the wrapping paper for the box.

Another object of this invention is to provide improved feeding mechanism for the box rings and heads.

Another object of this invention is to provide an improved ejector for casting the finished boxes from the machine.

Another object of this invention is to provide an automatic tension device for taking up the slack in the wrapping paper for the box and keeping it under uniform tension.

These and other objects of this invention will be fully described in the specification and pointed out in the claims at the end thereof.

In the accompanying drawings Figure 1 is a side elevation of our improved machine, the glueing device and automatic take-up of Fig. 3 being omitted. Fig. 2 is a top plan view of our improved machine, as shown in Fig. 1. Fig. 3 is an end elevation of our improved machine. Fig. 4 is a sectional elevation of the forming heads and frame and forming wheel, section being taken on the line $4^x$—$4^x$ in Fig. 1, with certain parts omitted. Fig. 5 is a vertical section taken on the line $5^x$—$5^x$ of Fig. 4. Fig. 6 is a detail view of the locking device for the forming head, looking in the direction of the arrow $6^x$ in Fig. 5. Fig. 7 is a detail view of the mechanism for communicating a reciprocal movement to a part of the box form. Fig. 8 is a side elevation of the box form and shaft. Fig. 9 is a section taken on the line $9^x$—$9^x$ of Fig. 8. Fig. 10 is a vertical longitudinal section, through the cam drum, the section being taken on the line $10^x$—$10^x$ of Fig. 2, Fig. 10 and 5 together showing practically a complete vertical longitudinal section of the whole machine. Fig. 11 is a top plan view of the mechanism for feeding the box heads and rings. Fig. 12 is an end elevation of the mechanism shown in Fig. 11. Fig. 13 is a top plan view of the ring feeding and centering lever. Fig. 14 is a front elevation of the ring feeding and centering lever. Fig. 15 is a section on the line $15^x$—$15^x$ of Fig. 14. Fig. 15 D is a detail view of a part of the centering device. Fig. 16 is a vertical section on the line $15^x$—$15^x$ showing the parts in a position different from that shown in Fig. 15, due to the advanced position of lever 184. Fig. 17 is a detail view of the operating lever that feeds the heads from the hopper and operates the ring feeding and centering mechanism. Fig. 18 is an end elevation of the main forming wheel partly broken away, looking at it from the direction of the arrow $18^x$ in Fig. 2. Fig. 19 is the working face of the main forming wheel, or a side elevation of the parts shown in Fig. 18. Fig. 20 is a section on the line $20^x$—$20^x$ in Fig. 18. Fig. 21 is a section on the line $21^x$—$21^x$ of Fig. 18. Fig. 22 is a section on the line $22^x$—$22^x$ of Fig. 18. Fig. $22^x$ is a side elevation of the joint between successive forming sections on the forming wheel. Fig. 23 is a plan view of the paper cutting off device. Fig. 24 is a side elevation of the paper feeding mechanism, looking at it from the direction indicated by the arrow $24^x$ in Fig. 2. Fig. 25 is a top plan view of the upper portion of the parts shown in Fig. 24. Fig. 26 is a section on the line $26^x$—$26^x$ in Fig. 24. Fig. 27 is a section on the line $27^x$—$27^x$ of Fig. 24. Fig. 28 is a section on the line 28ˣ—28ˣ of Fig. 25, showing the finger that holds the wrapping paper in feeding position. Fig. 29 is a side view of the box ejector. Fig. 30 is an enlarged sectional view on the line 30ˣ—30ˣ of Fig. 29. Fig. 31 is a detail view of the operating cam for the ejector. Fig. 32 is a plan view of the parts shown in Fig. 31. Fig. 33 is a section of the box in the first step of formation. Fig. 34 is a section of the box in the second step of formation, showing the paper wrapper around the ring and head ready to be tucked into the ring. Fig. 35 is a sectional view of the finished box section. Fig. 36 is a plan view of the shock absorber used to stop the rotating frame that carries the box forms. Fig. 37 is a section on the line 37ˣ—37ˣ of Fig. 36. Fig. 38 is a top plan view of the mechanism for applying glue to the wrapping paper for the box. Fig. 39 is a section on the line 39ˣ—39ˣ of Fig. 38. Fig. 40 is a section on the line 40ˣ—40ˣ of Fig. 39. Fig. 41 is a side elevation of the yielding take-up device looking at it in the direction of the arrow 41ˣ in Fig. 39. Fig. 42 is a side elevation of the driving mechanism of the yielding take-up device. Fig. 43 is a detail side elevation of the operating lever for the take-up device. Fig. 44 is a vertical section on the line 44ˣ—44ˣ of Fig. 1. Fig. 45 is a plan view of the cams for operating the head carriers and presser feet, the cams being cut across on the top section line of Fig. 10 and unrolled.

In the accompanying drawings like reference numerals represent like parts.

The improved machine comprises the bed plate 1 supported by suitable legs 2, 2 at the corners thereof. Mounted on the bed plate 1 are the brackets 3 and 4 for the purpose of supporting the bearings for the auxiliary power shaft 5 of the machine. Also mounted on the bed plate is the bracket 6 which supports the feeding mechanism for feeding the box heads and box rings referred to hereafter as the feeding device. Below the bed plate 1 are fastened the brackets 7 and 8 for supporting the main power shaft 9 of the machine, see Figs. 10 and 5.

The main power shaft 9 carries the gear 10 for driving the shaft, the cam 11 for operating the yielding take-up device, the cam 12 that operates the feeding device, the cam 13 that operates the feeding device for the paper wrappers, the main forming wheel 14, the cam 15 that operates the locking pin for the forming head, and the cam 16 that operates the mechanism for dividing the box form. On the end of the shaft 9 is provided a hand wheel 17 by which the shaft 9 may be turned manually. The shaft 9 also passes through the stationary cam 18, which cam is fastened to the bed plate in any suitable manner to hold it fixed against rotation in the position shown in Fig. 18. The bracket 19 is preferably employed for this purpose.

The auxiliary power shaft 5 carries at its right hand end shown in Fig. 10 the friction clutch 20 which is keyed to the shaft 5. Mounted to rotate loosely on this shaft is the driving gear 21 which gear carries thereon the mechanism for operating and driving the clutch 20. This shaft passes through a bearing in the bracket 4 on which bracket is carried the cam 22 for operating the clutch 20. Carried on the bracket 4 and surrounding the shaft 5 is the cam drum 23 which cam drum carries the cams for operating the head carriers 24 and 25, the presser feet 26 and 27, and the ejectors 28 and 29 for stripping the finished box off from the box form. The shaft 5 also carries the frame 30 by which the head carriers, the presser feet, etc., are supported for rotation with the shaft. Forged or shrunk on the shaft 5 is the disk 31 to which is fastened the frame 32 which rotates with the shaft. This frame carries the box forms 33 and 34.

Mounted under the bed plate 1 is the bracket 35 carrying the stud 36 on which is mounted the feeding device for the wrapping paper. Also mounted on the bed plate 1 is the bearing 37 in which is mounted the yoke lever 38 which operates to move the locking pin 39. Also mounted on the bed plate 1 is the bearing 40 for the link 41 which connects to the link 42 which in turn is connected to the lever 43 which lever operates the yielding take-up device. The lever 43 is mounted to oscillate in the bearing 44 provided on the frame 45 fastened to the bed plate.

Keyed to the bracket 4 is the cam 22 which cam is stationary. Adjacent to this cam is the gear wheel 21 on which gear wheel is carried the rocking arm 46, which rocking arm carries on its outer end the anti-friction roller 47. The rocking arm 46 is keyed to a pin 48 which is mounted in a bearing 49 in the gear wheel 21. The opposite end of this pin 48 has the cams 50 thereon, which operate when the pin is rocked by the cam 22 to spread the segments 51 and 52 so as to force them into engagement with the drum 53 of the clutch 20. The shape of this cam 22 is such as to force the anti-friction roller 47 out so as to operate the clutch and hold it in operation for a trifle less than half a revolution. This causes the gear 21 for each complete revolution to carry the shaft 5 around for one-half a revolution at which point the shaft 5 is stopped and held at rest by mechanism which will be hereinafter described.

The segments 51 and 52 of the clutch are drawn together by the tension springs 54 and 55, which springs operate as soon as the anti-friction roller 47 has passed the high portion of the cam 22, thereby causing the two portions of the clutch to separate at once. In this way the auxiliary power shaft is intermittently rotated a half revolution and then allowed to rest.

Mounted stationary on the bracket 4 is the cam drum 23. The bracket 4 has a hub 56 which fits into a corresponding sleeve 57 on the cam drum 23. The cam drum is fastened to the hub 56 by passing set screws (not shown) through the sleeve 57 against the hub 56. For this and other purposes the cam drum 23 is perforated at 58 and 59 and similar perforations are provided in the cam drum at 90 degrees thereto. A perforation 60 is also provided in the head of the drum on a line with the shafts 61 and 62. Inside of the cam drum 23 are fastened the plates 63, 64 and 65 suitably spaced apart and having their edges cut to form the cam grooves 66 and 67.

Surrounding the shaft 61 is provided a sleeve 68 and surrounding the shaft 62 is a sleeve 69. Mounted on the sleeve 68 is the head carrier 24 and mounted on the sleeve 69 is the head carrier 25. The sleeve 68 carries an anti-friction roller 70 thereon which is rotated in engagement with the stationary cam groove 66 by which the sleeves 68 and 69 and head carriers 24 and 25 are driven forward and back. Mounted on the shaft 61 is the presser foot 26 held in place thereon by the screw 71. At the end of the shaft 61 is provided the bearing plate 72 between which and the presser foot 26 is interposed the ball bearing 73. The presser foot 27 is mounted in like manner. Mounted in the frame 30 are also the shafts 74 and 75 on the forward end of each of which is carried the extension arms 76 and 77. Each of these arms is perforated to embrace the shafts 61 and 62 respectively along which these extension arms can slide. Interposed between these extension arms and the bearing plates 72 are the compression springs 78 and 79 by which the presser feet 26 and 27 are normally held in an advanced position. The shaft 61 is shouldered at 80 and the shaft 62 at 81. With these shoulders the extension arms 76 and 77 engage for the purpose of moving the shafts 61 and 62 backward in the sleeves 69 and 68. The shafts 74 and 75 are each provided with extension arms 83 and 82, which arms carry anti-friction rollers 85 and 84, which anti-friction rollers are rotated by the shaft 5 in engagement with the stationary cam groove 67 by which they are driven forward and back.

The extension arms 83 and 82 are sleeved to slide on the sleeves 68 and 69 and the head carriers 24 and 25 are grooved to slide on the shafts 74 and 75. In this way the several parts are prevented from twisting or turning from their correct position.

The head carrier 24 is slotted at 86 and the head carrier 25 is slotted at 87 through which slots the heads of the boxes are adapted to drop from the chute 88.

Mounted on the shaft 5 at the left hand end is the box form supporting frame 32. This frame consists of a sleeve 90 mounted on the shaft 5 carrying a disk head 91 at the right hand end as shown in Fig. 5. This disk is provided with bearings 92 and 93 in which are supported the box form shafts 94 and 95. These shafts 94 and 95 are alike. The shaft 94 carries on the end thereof one half of the box form 33: this half consisting of a flange that is formed integrally on the shaft or is shrunk thereon. Mounted to slide on this shaft is a sleeve 96. This sleeve is slotted with four slots as indicated at 97 and 98 through which slots project pins that are fastened in the shaft 94. These pins 99 engage with the pinion 100 supporting it and cause the shaft and sleeve to revolve rigidly therewith. The slots 97 in the sleeve 96 are to permit the sleeve to slide freely along the shaft for a limited distance without interfering with the pinions or the support thereof. The sleeve 96 carries at its left hand end the collars 101 and 102 suitably threaded and screwed onto the sleeve 96 being locked rigidly thereon. Between them are carried the ball bearing collars 103 and 104 between which a ring of balls are interposed, forming a ball bearing therebetween. Mounted in a suitable bearing on the sleeve 90 is the shaft 105 adapted to slide in said bearing. This shaft at its right hand end carries a yoke 106 which is adapted to engage in the annular groove between the collars 104 and 101. A longitudinal movement is imparted to the shaft 105 by means of a lever 107 for the purpose of moving the sleeve 96 longitudinally and separating the rear part of the box form 108, which is carried on the sleeve 96, from the front part which is carried on the shaft 94. The ball bearing between the collars 103 and 104 is provided so as to avoid undue frictional engagement between the collar 104 and the yoke 106. Carried on the shaft 94 is the nut 109 between which and the sleeve 96 is provided a compression spring 110. This spring tends to push the sleeve 96 forward for the purpose of keeping the two halves of the box forming head together. The outer end of the shaft 94 is supported in bearing 111 in which it is free to rotate. A large headed screw 112 is fastened in the left hand end of the shaft to prevent endwise movement of the shaft to the right and between the nut 109 and the bearing 111 is provided a ball thrust bearing 113.

Mounted on the main power shaft 9 is the forming wheel 14 which forming wheel is adapted to rotate in line with the box forming heads 33 and 34 and the pinions 100 carried thereon. This box forming wheel carries thereon a segmental rack 114: this rack is supported on the forming wheel by means of screws 115 extending sidewise through slots in the rack into said forming wheel. The rack 114 has a radial movement on the forming wheel by means of the slotted engagement with said screws 115 and the rack is held in its outward position by means of screws 115 extending sidewise between said rack and the flange 117 on said wheel. This yielding support of the rack facilitates the engagement of said rack with the pinions 100, 100 which pinions drive the box forms 33 and 34 and on the rotation of the forming wheel 14 the pinion 100 that is in engagement therewith is rotated thereby.

The shaft 5 and the disk 31 and the sleeve 90 and the box forms, etc., carried thereon are all rotated in unison by means of a clutch 20 which, as has already been explained, causes the shaft 5 and the parts connected therewith to rotate a half revolution in unison with the main driving shaft 9 and then permits it to remain idle while the main driving shaft 9 completes its revolution after which it is then driven another half revolution in unison with the main driving shaft 9, after which it remains idle while the main driving shaft completes another revolution, and so on indefinitely.

The driving gear 10 on the main power shaft 9 and the gear 21 on the auxiliary power shaft 5 are of the same diameter and have the same number of teeth so that the angular velocity of the shaft 5 while in motion is the same as the angular velocity of the main power shaft 9.

Mounted on the bracket 3 are the pins 118 and 39. The pin 39 is pressed upwardly by the compression of the spring 119 so that the upper end thereof engages with the recess 120 provided in the disk head 91 for that purpose. This pin is drawn down out of engagement with the disk head 91 by means of the cam 15 carried on the main power shaft 9. This cam engages with the anti-friction roller 121 carried on the yoke 38 and on the rotation of the shaft forces this yoke down once for each rotation of the shaft. The upper end of the yoke terminates in a fork 122 that engages with the head 123 on the bottom of the pin 39 so that on the oscillation of the yoke 38, the pin has gone down, leaving the disk head 91 free to rotate in unison with the auxiliary power shaft 5 and the clutch 20.

Adjacent to the pin 39 is provided the pin 118 which acts as a friction brake for stopping the disk 91 at the end of its rotation. For this purpose the beveled cams 124, 124 are provided on opposite sides of the disk 91, each of which in turn engages with the beveled upper end of the pin 118 and forces it down. The pin 118 is carried on the lever 125 which lever is pivoted at 126 on the frame of the shock absorber which is fastened to the under side of the bed plate 1 which bed plate is suitably cut away to accommodate the lever 125 and its bearing 126. The lever 125 has connected thereto a piston stem 127 on the lower end of which is a piston 128 which works in a cylinder 129. Below this piston is provided a compression spring 130 in the cylinder which spring is compressed by the forcing down of the pin 118. The cylinder 129 is filled with oil below the piston 128 and as the piston 128 is forced down it forces the oil out from the cylinder through the vent 131 into the reservoir 132: the size of the opening through which the oil is forced out is regulated by the needle valve 133 which is threaded at the outer end so as to make it adjustable. This forcing out of the oil through the needle valve is what retards the downward movement of the pin 118 and throws the extra load on the cam 124, causing the disk head 91 to come to rest gradually. After the cam 124 has passed the pin 118 the spring 130 acts to force the piston 128 up sucking the liquid back under the piston from the reservoir and pushing the pin 118 up to its normal position.

Pivoted on the bracket 3 is the lever 107 which operates to move the sleeve 96 longitudinally. This lever engages with the hooked end 134 of the shaft 105 that is in the lower position as indicated in Fig. 5. This lever is pivoted at 135 and carries on its lower end the anti-friction roller 136 which engages with the cam 16 that is carried on the shaft 9, see Fig. 7. The cam 16 is a single cam and operates on the lever 107 once for each revolution of the shaft 9, causing the shaft 105 that is in engagement therewith to be drawn to the left as shown in Fig. 5 for the purpose of dividing the box form that is connected thereto for a purpose that will be presently described. The cam 16 moves the lever in one direction against the expansion of the spring $107^x$, which spring normally holds the lever in the position shown in Figs. 5 and 7. The lever 107 may be modified to engage directly between the collars 101 and 104 on the sleeve 96, in which case the shaft 105 may be dispensed with.

Mounted on the main power shaft 9 so as to rotate integrally therewith is the main forming wheel 14. This main forming wheel consists of a disk having on the periphery thereof, an annular groove 137, which groove extends clear around the disk and has the uniform cross sections shown in Fig. 5. This main forming wheel carries the segmental rack 114 already referred to and three forming sections which are placed successively in the annular groove 137. The first of these forming sections is shown in cross section in Fig. 20, the second in Fig. 21 and the third in Fig. 22. The first of these sections presses the paper against the box as it is delivered from the feed mechanism of the wrapping paper. It will be understood, of course, that this wrapping paper is delivered in one, two or more strips, as may be desired, each of the strips being gummed on one side. Preferably the widest strip of wrapping paper is placed immediately in contact with the box and is the strip which connects the bottom to the ring of the box: the second strip of paper is preferably a different color and is purely for decoration and is preferably narrower than the ring of the box so that it does not overlap on the bottom. The wide strip is pasted directly to the box, the second strip is pasted to the first strip, and the third strip, if any, would be pasted to the second strip, or to the first strip or to both, as might be desired.

The first section 138 consists of a segmental piece of metal cut to the cross section shown in Fig. 20. It is in a single piece and has the length indicated between the marks 138$^x$ and 138$^y$ in Fig. 18. The section 138 is cut away to provide for the operation of the knife 143 in connection therewith. As shown in Fig. 20, section 138 is provided with a groove 140 deep enough to take in the flange on the box head. To the left of this groove, the surface of the section is cylindrical and to the right of this groove, it is slightly tapered or cone shaped and terminates to the right with a flange 141, which flange, however, may be omitted on this section. The cylindrical surface presses the wrapping paper against the ring of the box and presses the decorating paper against the wrapping paper, both of which strips of paper are fed on together. The groove 140 presses the wrapping paper around both sides of the flange of the box bottom and the cone shaped surface to the right of groove 140 presses the paper over, turning it in toward the bottom of the box, putting it in better position to be operated on by the second section.

In Figs. 18, 19 and 23, the knife that cuts the wrapping and decorating paper is shown and the construction and operation of this will now be described.

Mounted on the section 138, is the bearing 142, in which is pivotally mounted the cutting blade 143. The ledger blade is mounted on the section 138 and the bearing 142 is formed in connection with the ledger blade 144. The knife 143 carries thereon the crank 145 to which is connected a link 146, which link is connected in turn to the link 147. This link 147 at its rear end slides in the guide 148 and at its front end is connected to the lever 149 pivoted at 150 on the forming wheel 14. This lever 149 at its lower end carries the anti-friction roller 151 which bears against the cam 18, which cam is perforated and supported by the shaft 9 and which is held from rotation by the bracket 19, which rigidly connects it to the bed plate 1. As the anti-friction roller 151 travels around the cam, the knife is drawn back until the roller passes the high point 152 of the cam, upon which the torsion spring 153 causes the lever 149 to rock and draws the knife 143 down, cutting off paper of sufficient length to wrap once around the box with a suitable overlap. The link 147 is adjustable to regulate the travel of the knife 143.

The second forming section 154 is illustrated in cross section in Fig. 21. It consists of the main segmental section 155 having the flanges 156 and 157 thereon. Carried on the flange 156 is the forming segment 158 which segment turns up the paper at the open end of the box preparatory to having it tucked in. This segment is attached to flange 156 by means of the screws 159 on which are provided the compression springs 160 interposed between the forming segment 158 and the flange 156, by which the forming segment is yieldingly held in position. By the screws 159, the forming segment 158 may be adjusted in or out according to the depth of the box that is to be made by the machine. Adjacent to the flange 156 is provided the forming segment 161 which segment is provided with a groove therein to receive the flange of the box head adjacent to which the forming section 161 extends upwardly to press in against the bottom of the box, the paper that overlaps the bottom. The side of this forming section is slotted to receive the screws 162, which pass through the flange 157 and into the flange 156. The forming section 161 has a limited lateral and radial movement on the screws 162. Interposed between the forming section 161 and the segmental section 155, are the compression springs 163 which hold the forming section 161 out radially; and between the flange 157 and the forming section 161 are also provided springs 164 which hold the forming section yieldingly against the flange 156. The springs 164 are held in place by plates 165 which are fastened to the flange 157 by the screws 166.

The third forming section 167 is shown in Fig. 22. This section has the flanges 168 and 169 thereon, which flanges are substantially the same as the flanges 156 and 157 in forming section 154. It is also provided with the segmental forming section 170 which is mounted in the same way as is the forming section 161, but it does not have the forming segment corresponding to 158 in Fig. 21.

All of the sections 138, 154 and 167 are mounted to move radially in the groove 137 of the forming wheel in which they are carried. Each one of these sections is slotted transversely and radially as shown at 170 in Fig. 20 and through these slots pass the pins 171 on which pins the radial movement is permitted in each section. Each of the sections is pressed outwardly in a radial direction by the springs 172. Each of the sections is stepped as shown in Fig. 22$^x$, so that when one of the sections is pressed inwardly, it will carry the following section in with it so as to present a uniform forming surface to the box against which the sections press.

This improved machine is provided with automatic feeding mechanism for feeding the box heads, for feeding the rings and for bringing the rings and box heads together on the box form and for feeding the paper which is wrapped around the rings and box heads for the purpose of joining them together. Each of these feeding mechanisms will now be described in turn.

Mounted on the bed plate 1 of the machine is the bracket 6 on which is carried the feeding mechanism for the rings and for the box heads. The rings are carried in a hopper 173 and the box heads are carried in a hopper 174. The bottom of the hopper 173 is curved as shown in Figs. 3 and 12 and at the bottom of this hopper is an escapement 175 having the arms 176 and 177 thereon each of which arms has a pin 178 and 179 thereon respectively. The arms 176 and 177 constitute a fork and the arms and the pins 178 and 179 are spaced apart vertically so that the lower pin will engage one ring and the upper pin will engage the succeeding ring. The ends of the pins 178 and 179 are so positioned that the end of one pin will engage the ring opposite thereto before the other pin lets go of the ring opposite thereto. By means of this escapement, the rings are allowed to drop one at a time.

The bracket 6 has an overhanging arm 180 on which the hopper 173 is supported. This arm is slotted immediately under the opening in the hopper through which slot 182, the rings drop onto the curved support 181 shown in Figs. 12 and 15.

Pivoted at 183 on the bracket 6 is the swinging arm 184 having a cone shaped centering head 185 thereon. This cone shaped head is shown in cross section in Figs. 15 and 16. It comprises the central cone 186, having the stem 187 thereon which projects back to a plate 188 having wings extending on either side thereof; the end of the stem 187 is threaded so that the cone 186 and the plate 188 can be tied together by the nut 189. Surrounding the central cone 186 is the ring 190, having a cone shaped end of the same taper as the cone 186. This ring 190 has a flange 191 thereon projecting inwardly therefrom, which flange is engaged between the spring 192 and the head of the cone 186. The spring presses against the plate 188 at the rear and the flange 191 at the front, so that the parts are normally held in the position shown in Fig. 16. Mounted on the lever 184 is the lever 193. Through the levers 184 and 193 projects the pin 194: around this pin 194 at the rear is a compression spring 195 held in place thereon by the head 196. The lever 193 is normally held forward by the expansion of this spring 195 and holds the cone 186 forward, compressing the spring 192. The ring 190 has the flange 197 which is engaged by the ring 198 carried on the end of the lever 184 and is held back thereby while the cone 186 is held forward by the lever 193. As the spring 195 which presses the levers together is stronger than the spring 192 which tends to push them apart, the parts when all assembled as shown in Fig. 13, will all normally stand in the position shown in Figs. 13 and 15. The lever 193 engages the stem 187 and tends to push it forward to the position shown in Fig. 15. When a box ring has been dropped into the slot 182, the lever 184 will be swung forward by a mechanism hereinafter described causing the cones 186 and 190 to engage with the box ring, pick it up and center it thereon. The cones continue to advance carrying the ring toward the box form 33 and as it advances, the central cone 186 contacts with the overhanging arm 180 through the plate 188 by which its further advance is stopped. The lever 184 continues to advance compressing the spring 195 and permitting the spring 192 to press the ring 190 forward, carrying the ring toward the position shown in Fig. 16, until it is stopped by its flange 191, but the lever 184 with the ring 198 on the end thereof still continues to advance on the ring 190 and sweeps the box ring from the ring 190 onto the box form 33, as is shown in Fig. 16.

While the foregoing operation is being carried on, the box head feeds down through the chute 88 into the slot 86 of the head carrier 24 and when the box ring is in position on the box form as shown in Fig. 16 and the box head is in position in the head carrier 24, the clutch 20 operates to give the shaft 5 a half turn carrying around the box head and the box ring into contact with the forming wheel 14. While this half rotation is being accomplished, the cams 66 and 67 operate to move the head carrier and presser foot forward to bring the box head into contact with the ring and center it with regard thereto. The head carrier is then withdrawn while the presser foot remains and the operation of the forming wheel for applying the strips of paper to the box begins.

The feeding of the box heads will now be described.

Mounted on the bracket 6 is a base plate 199, having a collar 200 therein, in which rests the hopper 174 that contains the box heads. Mounted to reciprocate under the base plate 199 is the feeding slide 201 and this feeding slide is operated by the lever 202 mounted to operate on the stud 203 in the bracket 6. This lever 202 carries on its lower end the anti-friction roller 204 which is operated in one direction by the cam 12 on the power shaft 9. Supported on the bracket 6 is the bracket 205 on which is supported a pin 206. The lever 202 is perforated to embrace this pin. A compression spring 207 is mounted on said pin. This spring is compressed against the head 208 of the pin by the operating lever 202 while it is moved in one direction by the cam 12 and when the operating lever 202 is released by the cam 12 the expansion of the spring 207 drives the lever 202 in the reverse direction. The lever 202 engages with and operates the feeding plate 201 in both directions.

Between the base plate 199 and the bracket 6 an opening is left just wide enough to permit one head to pass therethrough and the reciprocation of the feeding slide 201 causes the box heads to be fed out through said opening into the curved chute 88 illustrated in Fig. 10 through which they are deposited into the box head carriers by gravity. The lever 184 is also driven from the lever 202. The lever 184 is in the form of a bell crank pivoted at 183. A link 209 connects the lever 202 with the arm 210 of the bell crank lever 184 so that the oscillation of the lever 202 will cause the oscillation of the bell crank 184 as well.

The escapement that regulates the dropping of the box rings is driven in the following manner: The escapement 175 is mounted to oscillate on the pin 211. This escapement has thereon the lever 212 on the end of which is carried the anti-friction roller 213. This anti-friction roller is held in contact with the bell crank 184 by means of the torsion spring 214, one end of which is fastened to the overhanging arm 180 and the rear end of which is fastened to the lever 212. As the bell crank 184 is moved in one direction, it oscillates the escapement 175 in that direction, twisting the spring 214 and it is moved in the reverse direction, the spring 214 operating on the escapement 175 to oscillate it in the other direction, moving the bell crank 184 back.

Mounted on the base plate of the hopper is a stud 215 on which the lever 216 is mounted to oscillate; this lever is driven at one end by the lever 202, the lever 202 moving it in one direction only, the lever 216 being moved in the reverse direction by the torsion spring 215ˣ. At its opposite end, this lever has connected thereto a link 217 which engages with the crank 218 keyed to the pin 219, which is mounted to oscillate in a suitable bearing in the overhanging arm 180. This pin on its opposite end carries the finger 220 which finger temporarily holds the box ring in place after it has been dropped into the curved support 181, that is, the box ring drops into the curved support 181 as soon as the box form which has received a ring, starts to revolve around the shaft 5, being carried around by the frame 32, and during this interval the fresh box ring is held in the curved support 181 by the finger 220 which finger is drawn aside as soon as the new box form is in place.

When the paper box has been finished on the box form at the bottom of the frame 32, the box form starts to rise and during this upward motion, the ejectors 28 and 29 work to strip the finished box from the box form so that when the box form reaches the top of the frame 32, it will be ready to receive a new box ring thereon. The construction and operation of these ejectors we are now about to describe. These ejectors are composed of two blocks 221 and 222 which are fastened together by the screws 223 and 224 pinching the shaft 5 between these blocks. Mounted on the blocks are the rocking arms 225 and 226, the rocking arm 225 being pivoted on an axis 227 and the arm 226 being pivoted on an axis 228. Each of the arms 225 and 226 terminates in a pair of curved fingers 229 and 230 which curved fingers surround the box forms 33 and 34, being normally placed a little behind them. Each of these rocking arms 225 and 226 is provided with an arm 231 and 232 extending laterally therefrom. Mounted on each of the extension arms 76 and 77 is a bearing 233 and 234 each of which is adapted to support a pin 235 and 236, each of which pins has an anti-friction roller on the free end thereof. Mounted on the arms 231 and 232 in a suitable bearing therefor are suitable pins 237 and 238 each of which carries at one end a plate 239 having a cam lug 240 thereon. This lug normally is carried in the path of the anti-friction roller, carried on the pins 235 and 236. When the extension arms 76 and 77 move backward, the anti-friction roller on the pin 236 at the bottom, engages with the lug 240 and causes the arm 231 by which it is supported to rock bodily around its support 227, causing the fingers 239 to engage with and strip the finished box off of the box form. As soon as the anti-friction roller on the pin 236 has moved back far enough to pass by the lug 240, the spring 241 operates to push the ejector arm back to its normal position. Each of the arms 231 and 232 is provided with an ear 242 through which passes a stem 243 which stem is fastened on its other end to the frame 30 and between the ear 242 and the frame 30 is placed a compression spring 241.

A torsion spring 244 is provided fastened at one end to the ear 242 and at the other end to the screw 245, the screw passing through the pin 237 and locking the head 246 thereon. This torsion spring normally serves to hold the pin 237 and its plate 239 and lug 240 in the position shown in Fig. 31, with the lug 240 resting against the plate 247, fastened on the arm 231 as a stop for the lug 240. It is these parts which cause the arm 231 to lift when the anti-friction rollers carried by the extension arms 76 and 77 engage with the lug 240 when moved in a reverse direction. The arm 231 lifts high enough to permit the anti-friction roller to pass under the lug 240 after which the arm drops back into place. When the anti-friction roller moves in a reverse direction, it engages the lug 240 and rotates the plate 239 on which it is carried around the pin 237 without disturbing the position of the arm 231 and when the anti-friction roller has passed the lug 240 and disengaged itself therefrom the torsion spring operates to restore the parts to the position shown in Fig. 31.

The mechanism for coating the wrapping paper with glue and feeding the wrapping paper through the machine will now be described.

Mounted on the bed plate 1 of the machine as shown in Fig. 1 is the supporting frame 45. This frame consists of two arms which extend downward having lateral extensions thereon at the bottom. Supported on these lateral extensions is a water tank 248 under which water tank is provided a gas burner 249 in which gas is burned under the tank for the purpose of keeping the tank and the water contained therein hot enough to keep paste in proper condition. Supported in the water tank is a paste tank 250, see Fig. 39. Supported on the water tank is a frame 251 having thereon feet 252 at the four corners thereof, which feet center the frame on the tank and serve as supports for the frame when it is desired to take the frame away from the tank and place it elsewhere for any purpose whatever. Supported on this frame 251 are the stationary spools 253 and 254 which carry the paper with which the boxes are to be wrapped. In front of these spools are supported the guide rollers 255 and 256 in front of which are the glue rollers 257 and 258; in front of these in turn are the guide rollers 259 and 260. Mounted at the end of the frame is the swinging arm 261 on which are mounted to rotate guide rollers 262 and 263. The glue rollers 257 and 258 have their lower sides immersed in the glue of the glue tank 250; the paper moves over and under the rollers in the direction indicated by the arrow in Fig. 39 and as the paper moves the glue roller revolves, picking up glue from the tank below and spreads it on the under side of the paper which passes over it. Bearing against the glue rollers are the scrapers 264 which are yieldingly pressed against the glue rollers for the purpose of scraping therefrom the surplus glue. The spools 53 and 54 are so constructed as to place a limited tension on the paper as it is unwound therefrom. The construction and mounting of the spools by which this result is obtained will now be described. Each of these spools 253 and 254 consists of two disks 265 and 266. The disk 266 carries the stem 267 thereon, which stem is cylindrical in shape and has the reduced end 268 thereon. The disk 265 has the lugs 269, 270 and 271 thereon. The lug 269 is perforated to receive the supporting pin 272 mounted on the frame 261 on which pin 272, the disk rests. The pin 272 is a tapered pin and the socket in the lug 269 which receives it is also tapered, the parts being adapted to fit each other snugly so as to avoid wabbling of the disk on its supporting pin. The upper end of the perforation on the lug 269 is threaded to receive the bolt 273 and the lock nut 274; the bolt 273 can be adjusted to limit the distance the pin 272 will enter the hole in the lug 269 by which a snug fit is secured between them and the crowding of parts that would interfere with the ready removal of the disk 265 is prevented. The lug 270 is also perforated to receive the supporting pin 275. The supporting pin 275 is merely a guide, the weight being borne by the pin 272. The lug 271 is provided on the disk 265 for the purpose of making the casting interchangeable for the purpose of forming a right or a left hand disk. The lug 271 can be perforated to receive a pin on the opposite side corresponding to the pin 275. By boring the lug 269 from the opposite end from that shown in Fig. 3 and by putting the bolt 273 and lock nut 274 in to correspond, the disk 265 can be used in the spool 253 instead of the spool 254 as shown in Fig. 38.

Attached to the disk 265 is the housing 276 loosely fastened thereon by several screws 277. This housing has a flange 278 through which the screws 277 may pass. It has also a shoulder 279 between which shoulder and the disk 275 is a compression spring 280. At the end of the housing 276 is a collar 281. The inner surface of the housing 276 is tapered at 282 for a purpose that will presently be explained. Inside of the housing and interposed between the reduced end 268 of the pin 267 and the tapered portion of the housing 282 is a sleeve 283, which sleeve has a reduced end 284 that passes out through the opening in the collar 281 and engages with the head or handle 285. The sleeve 283 has a longitudinal groove 286 therein which is engaged by the pin 287 which permits longitudinal movement of the sleeve along the housing. The sleeve 283 is provided with three circular recesses therein adapted to receive the balls 288, which balls make contact with the reduced end 268 of the pin 267 on the one side and the tapered portion 282 of the housing. The sleeve 283 is pressed forward and the housing is pressed backward, by the spiral spring 289. This causes the balls 288 to choke between the reduced end 268 and the tapered portion 282 clutching the two parts together. It will be seen that the housing and the pin 268 are always clutched together in the same place, and the housing 276 is brought closer to the disk 265 when the disks 265 and 266 are spaced farther apart. Between the disks 265 and 266 is carried the roll of paper which may be either wide or narrow according to the kind of work that is being done therewith. It is the width of this paper that determines the spacing apart of the disks 265 and 266 as it is the object of this part of the invention to draw the disks 265 and 266 together against the paper with a pressure that will be practically uniform at all times and for all widths of paper. This pressure is determined by the compression of the spring 280 which will exert a slightly greater pressure on a roll of wide paper than it will on a roll of narrow paper. To take the disks 265 and 266 apart it is only necessary to pull out on the head 285 and press in on the housing 276 which causes the clutch to be opened releasing the pin 268 permitting the ready removal of the disks 266 from the disk 265.

The guide rollers 255, 256, 259 and 260 consist of sleeves with a flange on each end thereof mounted to rotate freely on a supporting spindle. These rollers have a limited endwise movement on their spindles permitting the rollers to be separated in the middle by a space sufficient to permit of the ready insertion of the paper between them. The glue rollers 257 and 258 are supported to rotate on spindles, substantially the same as the guide rollers 255, etc. After leaving the rollers 259 and 260, the paper strip passes over the guide rollers 262 and 263 and onto the paper feeding plate 290. The roller 263 feeds the wide strip of paper and the roller 262 feeds the narrow strip of paper, the wide strip being usually white and the narrow strip colored. The narrow strip feeds onto the feeding plate 290 through a narrow groove in a plate 291 and the wide strip through a wide groove in the plate 292. The plate 291 is adjustable laterally on the plate 290 on which the plate 292 is also supported, so that the two strips of paper can be superimposed one on the other in any desired adjustment. This adjustment of the plate 291 is secured by providing suitable slots in the plate 290 through which large headed screws pass to engage with the plate 291. These screws can be loosened and the plate 291 moved laterally by the screw 291$^x$ and the screws tightened up, clamping the plate 290 between the heads of the screws and the plate 291.

Mounted on the plate 290 is the upright arm 293 on which is carried a sleeve 294 in which sleeve is rotatably mounted the pin 295 carrying a finger 296 thereon, the lower end of which presses against the plate 290, or against the strips of paper that will ordinarily lie between the finger 296 and the plate 290. This finger holds the paper securely in position while at rest ready for the next forward feed thereof onto the box that is being formed. The plate 290 is supported on the arm 297 pivoted on the stud 36 carried on the bracket 35 supported from the bed plate 1. The lever 297 is adjustable sidewise on the stud 36 by a construction that will now be described. The stud has a shoulder 340 thereon and has a large head 341 at the end thereof. The small end of it is threaded to be engaged by the nut 342 by which it is clamped in place. On the stud 36 is placed the sleeve 343 that is threaded. The lever 297 is centered to oscillate on this sleeve and can be adjusted laterally thereon by turning the nuts 344 and 345. This arm has at its lower end a pin 299 carrying an anti-friction roller 300 thereon which anti-friction roller is engaged by the cam 13 carried on the shaft 9 so that on the rotation of the shaft, the feeding plate is moved forward toward the lower box form.

The knife 143 severs the paper so as to leave a half or three-quarters of an inch projecting out from the plate 290. The upper surface of this paper is gummed and as the plate 290 is moved forward by the cam 13, this gummed upper surface of the paper is applied to the under surface of the box on the lower box form and between the box and the forming wheel. This gummed paper adheres to the box which is being rotated with the box form so that the paper is drawn through the guide and applied to the box until the further forward movement of the paper is arrested by the action of the knife, cutting it off. When the feeding plate 290 moves forward to apply the paper to the box, the arm 261 supporting the rollers 262 and 263 must move forward with it as well. This arm and its rollers constitute a movable take up device the construction and operation of which will now be described.

The arm 261 is pivoted at 301. Pivoted to the arm 261 at 302 is the pin 303 having a nut 304 thereon. This pin plays into a sleeve 305; between this sleeve 305 and the nut 304 is placed the compression spring 306 surrounding the pin 303. This pin passes on through the sleeve 305 and carries on its outer end a nut 307 and on the pin 303 is placed the compression spring 308 between the sleeve 305 and the nut 307. The sleeve 305 travels through a bearing in a lug 309 carried on the frame 251. Between the sleeve 305 and the spring 308 is interposed a washer 310 which washer is independent of the sleeve. Attached to the sleeve 305 is the link 311 connected to the lever 43, which lever is pivoted at 44 and is attached on its upper end to a link 42. The other end of the link 42 is hung from the bed plate 1 by a link 41. The link 42 has an anti-friction roller 312 which bears against the cam 11 on the power shaft 9 by which it is reciprocated.

Mounted on the frame 45 is a pin 313 to the outer end of which is attached a tension spring 314, the other end of which is attached to the lever 43 and by which the lever 43 and link 311 are normally moved in the direction of the arrow 315. The cam 11 operates to move the lever and link in the opposite direction against the tension of the spring, thus relieving the paper of the tension that would otherwise be thrown upon it by the spring 314. When the arm 261 moves in the reverse direction, the momentum of it is taken up by the spring 308 by which it is brought gradually to rest.

The rollers 262 and 263 are yieldingly mounted on the arm 261 in the manner we will now describe.

Fastened on the arm 261 are the pins 316 and 317 on which are mounted to oscillate the sleeves 318 and 319, each of which carries an arm 320 and 321, on which are supported the pins or studs 323 and 322 on which the rollers 262 and 263 are mounted to rotate. Stationary pins 324 and 325 are mounted on the arm 261 and the arms 320 and 321 are pressed back against these pins by the springs 326 and 327, which springs are fastened at one end to pins 328 and 329 and at the other ends to the arms 320 and 321. Spring 326 is the stiffer as it puts tension on the roller that carries the larger paper.

The foregoing is a detailed description of the construction and operation of the separate and individual parts.

A brief review of the operation of the machine as a whole for the forming of a box will now be given.

When the machine has been set in operation the main power shaft 9 rotates continuously in one direction and the auxiliary power shaft 5 rotates intermittently to correspond therewith. During one-half of the revolution of the shaft 9 the shaft 5 rotates to correspond therewith, this being determined by the operation of the clutch 20 which forces the coöperation of the parts by means of the cam 22 shown in Fig. 44. While the shaft 5 is at rest the feeding mechanism operates to feed the ox head into the box head carrier 24 at the top of the machine, which box head remains loosely in position therein. When the shaft 5 begins to rotate, the cam 67 operates on the anti-friction roller 85 to carry the presser foot 26 forward into contact with the box form, and the cam 66 operates to carry the box head carrier 24 forward until the box head is engaged with the box form, and then operates to draw it back. A diagrammatic view of these cams is shown in Fig. 45 of the drawings. While the shaft 5 is at rest the box ring is fed into the holder 181 shown in Fig. 15, which ring is then forced up on the cone 185 as it advances toward the box form, the parts first being in the position shown in Fig. 15 and afterward in the position shown in Fig. 16, in which position the box ring has been placed on the box head. The cone 185 is then withdrawn and the box forming head with the ring thereon starts to rotate in unison with the head carrier and presser foot, and during this rotation the head carrier and presser foot advance and bring the box head into contact with the box forming head and the box ring. These parts are thus brought into contact by the time the upper box forming head shown in Fig. 5 has reached the lowest position, or in other words, has been rotated through 180 degrees, in which position it is stopped on the box ring, and the box forming head is then operated upon by the box forming wheel 14 which wraps around it the paper. The box forming wheel first applies the paper with its gummed side up, to the outside of the box ring and the head. The paper is wider than the width of the box and the parts of the box forming wheel shown in Figs. 20, 21 and 22 operate successively to turn up the edges of the paper, pressing the one overlapping edge of the paper firmly against the bottom of the box and turning the other overlapping edge across the inside of the box. Just before, however, the forming wheel has operated to turn the overlapping edge across the inside of the box, the lever 107 operates to divide the box forming head 34, drawing the sleeve 96 back and with it the disk 108, forming the rear part of the box form. The forming segment 158 on the second section then turns up an overlapping edge of paper between the disk 34 and the disk 108, and as the disk 108 subsequently advances this overlapping edge of paper is turned into the box and pressed firmly against the inside of it. After the box has been completed in this way, the shaft 5 again starts to rotate and during its rotation the ejector 29 operates to strip the completed box off of the box head, upon which it drops out of the machine. The parts operate continuously in this way, the upper box forming head receiving the box ring and the box head carrier receiving the head of the box and being rotated to the under position, during which the two parts are brought together, and while in the under position the parts are wrapped together by the paper wrapper, after which the finished box is carried up while the ejector works and throws it from the machine. Two of the box forming heads and two of the disk head carriers are provided so that the operation of the machine may be continuous in this particular, the one of each of them being loaded, so to speak, while it is in idle position, while the other of each of them is operating to form the box when it is in the lowest and active position.

The box is completed by putting a collar in one-half of it, using that half as the base of the box and using the other half as the top of the box, the top fitting over said collar. The collar is preferably fastened in the bottom of the box by gluing the parts thereto.

Having thus described the invention, what we claim as new and patentable is as follows:

1. The combination of a rotating forming wheel, a box form mounted to rotate in contact therewith, a pinion for driving said box form, a curved rack mounted on said forming wheel, capable of engaging said pinion, whereby said pinion and said box form are rotated with said forming wheel, said curved rack being mounted to yield radially on said forming wheel.

2. The combination of a box form comprising two parallel disks, a shaft supporting one of said disks, a sleeve for supporting the other of said disks, said sleeve being concentric with said shaft and longitudinally movable on said shaft, a collar on said sleeve, a yoke engaging with said collar, a sliding shaft on which said yoke is mounted, a dog on the end of said shaft, a lever engaging intermittently with said dog by which said shaft is reciprocated.

3. The combination in a box forming machine of a shaft, a frame mounted thereon, divided box forms comprising two parallel solid disks supported in said frame, means located on one side of said frame for separating the parts of said box forms successively leaving the box on one of said disks, said frame being rotatable to bring said forms alternately into engagement with said means.

4. The combination in a box forming machine of a shaft, a frame mounted thereon, divided box forms comprising two parallel solid disks supported in said frame, means located on one side of said frame for separating the parts of said box forms successively leaving the box on one of said disks, said frame being rotatable to bring said forms alternately into engagement with said means, means for stopping said frame from rotation as said box forms successively engage with said dividing means.

5. In a box forming machine, the combination of a shaft, a frame mounted thereon, box forms mounted to rotate in said fame, each of said box forms being composed of two solid disks, one of said disks being movable away from the other, means located outside of said frame for successively engaging with the movable part of said box form to move it away from the other part of said box form without disturbing the position of the box carried on said form.

6. In a box forming machine, the combination of a shaft, a frame mounted thereon, box forms mounted to rotate in said frame, each of said box forms being composed of two solid disks, one of said disks being movable away from the other, means located outside of said frame for successively engaging with the movable part of said box form to move it away from the other part of said box form, means for rotating both of said parts of said box form in unison in either position for the purpose of forming the box.

7. The combination in a box forming machine of a bed plate, a bracket mounted thereon, a shaft mounted to rotate in said bracket, a frame mounted on said shaft to rotate therewith, bearings in said frame, shafts mounted to reciprocate longitudinally in said bearings, dogs mounted on the rear end of each of said shafts, a lever mounted adjacent to said bracket, engaging alternately with said dogs to reciprocate said shafts longitudinally.

8. In a box forming machine, the combination of a shaft, a frame mounted thereon, recesses cut in opposite sides of said frame, box forms mounted on said frame, one adjacent to each of said recesses, a locking pin mounted below said frame to engage with said recesses successively and hold said frame in a predetermined position, means for rotating said shaft and said frame intermittently, a cam on said frame in advance of each of said recesses, a friction brake for engaging with each of said cams to reduce the angular velocity of said frame.

9. In a box forming machine, the combination of a shaft, a frame mounted thereon, recesses cut in opposite sides of said frame, a locking pin mounted below said frame to engage with said recesses successively and hold said frame in a predetermined position, means for rotating said shaft and said frame intermittently, a cam on said frame in advance of each of said recesses, a friction brake for engaging with each of said cams to reduce the angular velocity of said frame, sliding shafts in said frame, dogs on the rear ends of said shafts, a lever mounted adjacent to said frame, capable of engaging with said dogs to reciprocate said shafts, said locking pin serving to lock said rotating frame in position for engagement with each of said dogs by said lever.

10. In a box forming machine, the combination of a shaft, a frame mounted thereon, recesses cut in opposite sides of said frame, a locking pin mounted below said frame to engage with said recesses successively and hold said frame in a predetermined position, means for rotating said shaft and said frame intermittently, shafts mounted in said frame adjacent to each of said recesses, a box form carried on each of said shafts, a forming wheel with which each of said box forms coöperates successively, said locking pin serving to lock said frame with one of said box forms adjacent to or in contact with said forming wheel.

11. In a box machine, the combination of a forming wheel having a series of differently shaped forming sections thereon progressively arranged and at equal distances from the center, a curved rack mounted on said forming wheel adjacent to said forming sections.

12. In a box machine, the combination of a forming wheel having a series of differently shaped forming sections thereon progressively arranged and at equal distances from the center, a curved rack mounted on said forming wheel adjacent to said forming sections, said curved rack being radially movable.

13. The combination in a box machine of a forming wheel, differently shaped forming sections mounted on the periphery of said wheel and progressively arranged thereon and at equal distances from the center, rigid and yielding surfaces included in said forming sections.

14. The combination in a box machine of a forming wheel, forming sections mounted on the periphery of said wheel and progressively arranged thereon, rigid and yielding surfaces included in said forming sections, each of said forming sections being yieldingly mounted on the periphery of said wheel for a radial movement.

15. The combination in a box machine of a forming wheel, forming sections mounted on the periphery of said wheel and progressively arranged thereon, rigid and yielding surfaces included in said forming sections, each of said forming sections being yieldingly mounted on the periphery of said wheel for a radial movement, stepped engagement between successive forming sections whereby the depression of one will cause the depression of the next succeeding.

16. The combination in a box machine of a forming wheel, forming sections mounted on the periphery of said wheel at equal distances from the center, each of said sections being longer than the periphery of the box to be formed on said machine said sections being adapted to apply pasted paper to the side of the box and turn it up on the ends of the box.

17. The combination in a box machine of a forming wheel, forming sections mounted on the periphery of said wheel at equal distances from the center, each of said sections being longer than the periphery of the box to be formed on said machine, a box rotatably supported in said machine in contact with said forming sections said sections being adapted to apply pasted paper to the side of the box and turn it up on the ends of the box.

18. The combination in a box machine of a forming wheel, forming sections mounted on the periphery of said wheel, a knife mounted on the forming wheel to operate in the first of said forming sections, a stationary cam mounted in the machine to cause the operation of said knife.

19. The combination in a box machine of a forming wheel, forming sections mounted on the periphery of said wheel, a knife mounted on the forming wheel to operate in one of said forming sections, a stationary cam mounted in the machine to cause the operation of said knife.

20. The combination in a box machine of a forming wheel, a forming section mounted on the periphery thereof, a ledger blade provided in said forming section, a cutting blade mounted on the forming wheel adjacent to said ledger blade, a crank on said cutting blade, a connecting rod attached to said crank, a sliding rod mounted on said forming wheel to which said connecting rod is attached, a lever pivoted on said forming wheel connected to said sliding rod at one end and having an anti-friction roller mounted on the other end, a spring on said lever yieldingly holding it in a given position, a stationary cam mounted in the machine which causes the oscillation of said lever on the rotation of said forming wheel against the force of said spring and releases said lever so as to permit the reverse movement thereof by said spring and the operation of said cutting blade in connection therewith.

21. In a box machine, the combination of a forming wheel, a groove in the periphery of said forming wheel having a flange on each side thereof, a series of forming sections set in said groove, pins passing through said flanges and through radial slots in said forming sections, said forming sections having a limited radial movement on said pins, compression springs interposed between said forming sections and said forming wheel for moving said forming sections outwardly.

22. The combination in a box machine of a forming wheel having a relatively large diameter, a segmental forming section thereon having a plain surface and a beveled surface and a flange, said plain surface and said beveled surface being separated from each other by a groove.

23. The combination in a box machine of a forming wheel having a forming section thereon, a plain forming surface forming an integral part of said forming section, a forming segment on one side of said forming surface, said forming segment having a groove and a flange therein forming a continuation of said forming surface, said forming surface having on the other side thereof a forming segment having a flange overlapping said forming surface, each of said segments being movable laterally from said forming surface.

24. The combination in a box machine of a forming wheel having a forming section thereon, a plain forming surface forming an integral part of said forming section, a forming segment on one side of said forming surface, said forming segment having a groove and a flange therein.

25. The combination in a box machine of a shaft and a rotating frame mounted thereon, cylindrical head carriers mounted on said frame, a receiving slot across one side of each of said head carriers through which the box head is fed into the carrier.

26. The combination in a box machine of a shaft and a rotating frame mounted thereon, cylindrical head carriers mounted on said frame, a receiving slot across one side of each of said head carriers, a presser foot carried in said head carriers and mounted to move therein across said slot.

27. In a box machine, the combination of a shaft and a rotating frame mounted thereon, head carriers carried on said frame parallel to said shaft, a stationary cam surrounding said frame, connections between said head carrier and said cam whereby on the rotation of said frame said head carrier is moved longitudinally forward and back.

28. In a box machine, the combination of a shaft and a rotating frame mounted thereon, head carriers carried on said frame, a presser foot mounted in said head carrier, a stationary cam surrounding said frame, connections between said presser foot and said cam whereby on the rotation of said frame said presser foot is moved longitudinally forward and back.

29. The combination in a box machine of a bed plate, a bracket mounted thereon, a shaft mounted to rotate in said bracket, a cam drum having a plurality of cams therein mounted stationary on said bracket, head carriers mounted on said frame, a sleeve passing through said frame for each of said head carriers, said sleeve having a head carrier mounted on one end thereof, said sleeve engaging at its other end with one of said cams in said drum, a shaft mounted to slide in said sleeve, a presser foot carried on the forward end of said shaft, an extension arm mounted on said shaft and projecting through a slot in said head carrier, a sliding shaft mounted in said frame and engaging with said extension arm, said shaft being provided with means for engaging with another cam in said drum, by which on the rotation of said frame said head carrier and said presser foot are moved longitudinally in unison and independent of each other.

30. The combination in a box machine of a frame, box head carriers mounted thereon, a slot extending transversely of each of said box head carriers on one side thereof, a slot extending longitudinally of said carrying heads on the other side thereof, a shaft mounted to move longitudinally through said box head carriers, an extension arm carried on said shaft and extending sidewise through said longitudinal slot.

31. In a box machine the combination of a shaft, a frame mounted to rotate thereon, sleeves mounted in said frame capable of moving longitudinally in said frame, box head carriers mounted on said sleeves, shafts mounted to reciprocate in said sleeves, means to cause said shafts to reciprocate in said sleeves.

32. The combination in a box machine of a frame, a box head carrier mounted thereon, a slot extending longitudinally of said head carrier on one side thereof, a shaft mounted to move longitudinally through said box head carrier, an extension arm carried on said shaft and extending sidewise through said longitudinal slot, a presser foot carried on the end of said shaft, a spring on said shaft interposed between said presser foot and said extension arm, said shaft and said presser foot having a yielding engagement with said extension arm.

33. The combination in a box machine of a frame, box head carrier mounted thereon, a slot extending longitudinally of said box head carrier on one side thereof, a shaft mounted to move longitudinally through said box head carrier, an extension arm carried on said shaft and extending sidewise through said longitudinal slot, a presser foot carried on the end of said shaft, a spring on said shaft interposed between said presser foot and said extension arm, said shaft and said presser foot having a yielding engagement with said extension arm, a ball bearing interposed between said presser foot and said extension arm.

34. The combination in a box machine of a shaft, bearings therefor, rotating frames carried on said shaft, one of said frames supporting a box form and the other of said frames supporting a box head carrier and a presser foot, said box form, box head carrier and presser foot being in line with each other.

35. The combination in a box machine of a shaft, bearings therefor, rotating frames carried on said shaft, one of said frames supporting a box form and the other of said frames supporting a box head carrier and a presser foot, said box form, box head carrier and presser foot being in line with each other, means for causing said box head carrier and said presser foot to move toward and away from said box form.

36. The combination in a box machine of a shaft, bearings therefor, frames carried on said shaft, one of said frames supporting a box form and the other of said frames supporting a box head carrier and a presser foot, said box form, box head carrier and presser foot being in line with each other, a swinging arm mounted independent of said shaft and operating between said box form and said box head carrier, a cone carried on said swinging arm, said arm being capable of moving said cone toward and away from said head.

37. The combination in a box machine of a shaft, bearings therefor, frames carried on said shaft, one of said frames supporting a box form and the other of said frames supporting a box head carrier and a presser foot, said box form, box head carrier and presser foot being in line with each other, a swinging arm mounted independent of said shaft and operating between said box form and said box head carrier, a cone carried on said swinging arm, said arm being capable of moving said cone toward and away from said head, means for rotating said shaft to carry said box form, said box head carrier and presser foot out of line with said swinging arm.

38. The combination in a box machine of a shaft, bearings therefor, frames carried on said shaft, one of said frames supporting a box form and the other of said frames supporting a box head carrier and a presser foot, said box form, box head carrier and presser foot being in line with each other, a swinging arm mounted independent of said shaft and operating between said box form and said box head carrier, a cone carried on said swinging arm, said arm being capable of moving said cone toward and away from said head, means for rotating said shaft to carry said box form, a box head carrier and presser foot out of line with said swinging arm, means for moving said box head carrier and said presser foot toward said box form during such rotation of the shaft.

39. The combination in a box machine of a shaft, a rotating frame mounted thereon, box forms supported on said frame, said box forms being adapted to receive box rings thereon, an arm pivotally mounted adjacent to said box forms and independent thereof, a centering cone mounted on said arm, said centering cone being adapted to justify the box rings thereon and deliver them to the box forms.

40. The combination in a box machine of a reservoir for box rings, an escapement for regulating the feed of box rings from said reservoir, said escapement device having pins thereon adapted to engage inside of the box rings alternately from opposite sides thereof, a centering device comprising a cone shaped head for picking up each box ring as it passes said escapement device.

41. The combination in a box machine of a centering device comprising a cone shaped head, said cone shaped head being made in sections the outer section having a cylindrical seat thereon for a box ring, one of said sections telescoping within the other the box ring being fed over both of said sections to said seat.

42. The combination in a box machine of a centering device comprising a cone shaped head, said head being made in sections, the central section of said head being adapted to telescope in the outer section of said cone shaped head, a flange in said outer section for arresting the inward movement of said central section in said outer section.

43. The combination in a box machine of a centering device comprising a cone shaped head, said head being made in sections, the central section of said head being adapted to telescope in the outer section of said cone shaped head, a flange in said outer section for arresting the inward movement of said central section in said outer section, said central section having a stem with an enlarged head thereon, a compression spring interposed between the head of said central section and the flange of said outer section for normally holding said central section in its telescoped position.

44. The combination in a box machine of a cone shaped head, said head being formed of two concentric sections, each of said sections having a portion of a conical surface thereon, said inner section being adapted to be pressed down into said outer section.

45. The combination in a box machine of a cone shaped head, said head being formed of two concentric sections, each of said sections having a portion of a conical surface thereon, said inner section being adapted to be pressed down into said outer section, means for yieldingly holding said inner section out with the cone surface of the two sections in line with each other.

46. The combination in a box machine of an arm, a ring on the end of said arm, a cone shaped centering head supported in said ring, a flange on the rear end of said cone shaped head.

47. The combination in a box machine of an arm, a ring on the end of said arm, a cone shaped centering head supported in said ring, a flange on the rear end of said cone shaped head, said ring being capable of movement along said head.

48. The combination in a box machine of an arm, a ring on the end of said arm, a cone shaped centering head supported in said ring, a flange on the rear end of said cone shaped head, said ring being capable of movement along said head, said head having a limited movement independent of said arm, and means for holding said head during the relative movement of said ring.

49. The combination in a box machine of an arm, a lever pivoted on said arm, a strong spring pressing said lever against said arm, a cone shaped head supported by said arm, said cone shaped head being in two sections, the inner section of said head being carried on said lever and being pressed forward thereby, the outer section being pressed rearwardly by said arm, a weak spring between said two sections, compressed thereby.

50. The combination in a box machine of an arm, a lever pivoted on said arm, a strong spring pressing said lever against said arm, a cone shaped head supported by said arm, said cone shaped head being in two sections, the inner section of said head being carried on said lever and being pressed forward thereby, the outer section being pressed rearwardly by said arm, a weak spring between said two sections, compressed thereby, said strong spring tending to hold said sections with the cones thereon in line with each other, said weak spring tending to telescope the outer section over the inner section.

51. The combination in a box machine of a guide, a box form and a cone shaped head projecting into said guide, said guide being adapted to support a box ring therebetween, means for engaging said cone shaped head with said box ring, means for compressing said cone shaped head against said box form and transferring said box ring from said head to said box form.

52. The combination in a box machine of a guide, a box form and a cone shaped head projecting into said guide, said guide being adapted to support a box ring therebetween, means for engaging said cone shaped head with said box ring, means for compressing said cone shaped head against said box form and transferring said box ring from said head to said box form, means for moving said box form away from said cone shaped head.

53. The combination in a box machine of a guide, a box form and a cone shaped head projecting into said guide, said guide being adapted to support a box ring therebetween, means for engaging said cone shaped head with said box ring, means for compressing said cone shaped head against said box form and transferring said box ring from said head to said box form, means for moving said box form away from said guide.

54. In a box machine, the combination of a cylindrical non-expansible box form and a centering device having a cylindrical part and a cone shaped end, the cylindrical part of said box form and said centering device being substantially of the same diameter, said centering device being adapted to deliver the box ring directly to the box form.

55. In a box machine, the combination of a box form with a centering device having a cone shaped end composed of a plurality of telescoping parts, said cone shaped end being adapted to be compressed against said box form.

56. In a box machine, the combination of a short stationary guide having a recess therein, a box form and a centering device projecting into said recess from opposite sides thereof, a slot in said guide through which a box ring is adapted to be fed between said centering device and said box form.

57. In a box machine, the combination of a guide having a recess therein, a box form and a centering device projecting into said recess from opposite sides thereof, a slot in said guide through which a box ring is adapted to be fed between said centering device and said box form, means for moving said centering device to engage with a box ring and transfer it directly to the box form.

58. In a box machine, the combination of a guide adapted to hold a box ring therein, a centering device adapted to pick up the box ring and center it thereon, a box form opposite thereto, means for transferring the box ring from said centering device directly to said box form.

59. In a box machine, the combination of a shaft, a box form and a box head carrier carried on said shaft in line with each other, suitably spaced apart, a box ring feeding device for placing box rings around said box form supported independently of said shaft between said box head carrier and said box form, means for rotating said shaft to carry said box form and said box head carrier out of line with said box ring feeding device.

60. In a box machine, the combination of a shaft, a box form and a box head carrier carried on said shaft in line with each other, suitably spaced apart, a box ring feeding device for placing box rings around said box form supported independently of said shaft between said box head carrier and said box form, means for rotating said shaft to carry said box form and said box head carrier out of line with said box ring feeding device, means for bringing said box form and said box head carrier together.

61. In a box machine, the combination of a shaft, a box form and a box head carrier carried on said shaft in line with each other, suitably spaced apart, a box ring feeding device for placing box rings around said box form supported independently of said shaft between said box head carrier and said box form, means for rotating said shaft to carry said box form and said box head carrier out of line with said box ring feeding device, means for bringing said box form and said box head carrier together, a presser foot in said box head carrier for pressing the box head against said box form.

62. In a box machine, the combination of a hopper adapted to hold box rings, an escapement mechanism reciprocating centrally across said hopper engaging in and disengaging from said rings successively and thereby operating to feed said rings one at a time into said machine.

63. In a box machine, the combination of a hopper adapted to hold box rings, an escapement mechanism comprising a yoke having arms embracing both sides of said hopper, a pin on each arm of said yoke projecting centrally into said hopper, said pins being spaced apart vertically less than the diameter of the box rings fed through said hopper and being adapted to alternately engage in said box rings, said pins slightly overlapping each other, the upper pin being adapted to engage with a box ring as the lower pin is disengaged from a box ring, permitting said box ring to drop into the machine.

64. In a box machine, the combination of a hopper adapted to hold box rings, an escapement mechanism comprising a yoke having arms embracing both sides of said hopper, a pin on each arm of said yoke projecting centrally into said hopper, said pins being spaced apart vertically less than the diameter of the box rings fed through said hopper and being adapted to alternately engage in said box rings, said pins slightly overlapping each other, the upper pin being adapted to engage with a box ring as the lower pin is disengaged from a box ring, permitting said box ring to drop into the machine, a box form for receiving said box ring, said escapement operating to drop a ring when said box form is in position to receive it.

65. In a box machine, the combination of a hopper containing box rings and a hopper containing box heads, a box form normally placed below and adjacent to said hopper for said box rings, feeding mechanism for feeding a single box ring from said hopper directly on to said box form, a box head carrier normally stationed below said hopper for the box heads, means for feeding said box heads from said hopper into said box head carrier, means for bringing said carrier and said box form together to place the box heads on the box rings.

66. In a box machine, the combination of a guide, of a centering device on one side of said guide, a finger on the other side of said guide, said finger and said centering device being adapted to hold a box ring between them, a box form for receiving said ring directly from the centering device, means for drawing said finger aside when said box form is in position to receive said ring.

67. In a box machine, the combination of a main power shaft, a cam mounted thereon, a lever pivoted adjacent thereto and oscillated by said cam, a vertical hopper containing box rings, a feeding mechanism for the box rings located below the hopper comprising a bell crank, said lever being connected to one arm of said bell crank and causing said bell crank to rock on the oscillation of said lever, a box form for receiving a box ring thereon, said feeding mechanism operating to feed the box ring from the hopper to the box form.

68. In a box machine, the combination of a main power shaft, a cam mounted thereon, a lever pivoted adjacent thereto and oscillated by said cam, a vertical hopper containing box rings, a feeding mechanism for the box rings located below the hopper comprising a bell crank, said lever being connected to one arm of said bell crank and causing said bell crank to rock on the oscillation of said lever, said cam operating to drive said lever in one direction only, a compression spring serving to drive said lever in the reverse direction, a box form for receiving a box ring thereon, said feeding mechanism operating to feed the box ring from the hopper to the box form.

69. In a box machine, the combination of a main power shaft, a cam mounted thereon, a lever pivoted adjacent thereto and oscillated by said cam, a feeding mechanism for the box heads comprising a slide, said lever engaging with said slide and causing it to reciprocate, a feeding mechanism for the box rings comprising a bell crank, said lever being connected to one arm of said bell crank and causing said bell crank to rock on the oscillation of said lever.

70. In a box machine, the combination of a main power shaft, a cam mounted thereon, a lever pivoted adjacent thereto and oscillated by said cam, a feeding mechanism for the box heads comprising a slide, said lever engaging with said slide and causing it to reciprocate, a feeding mechanism for the box rings comprising a bell crank, said lever being connected to one arm of said bell crank and causing said bell crank to rock on the oscillation of said lever, a centering device carried on said bell crank for said box rings, a finger for holding the box rings against said centering device, a lever and connecting rod operated by the slide for removing said finger from said box rings.

71. The combination in a box machine of a shaft, a frame mounted thereon, divided box forms supported in said frame, means independent of said frame for separating the parts of said box forms successively, said frame being rotatable to bring said forms alternately into engagement with said means, a main power shaft, a cam thereon for operating said means.

72. The combination in a box machine of a shaft, a frame mounted thereon, divided box forms supported in said frame, means independent of said frame for separating the parts of said box forms successively, said frame being rotatable to bring said forms alternately into engagement with said means, a main power shaft, a cam thereon for operating said means, a box forming wheel on said main power shaft for engaging with said box forms during the operation of said means.

73. In a box machine, the combination of a main power shaft, a box forming wheel mounted thereon, three forming sections mounted on said forming wheel, an auxiliary power shaft, box forms supported thereon, each of said box forms being adapted to be covered by the side and head of a box, said forming wheel being adapted to wrap a strip of paper around the side and the head of a box, said strip of paper being wider than the side of the box, said forming wheel being adapted to wrap the strip of paper around the box with its first section, bend up the edges of said strip of paper with the second section, fasten the edge of said strip of paper to the bottom of the box with its second and third sections, and permit the box form to operate to tuck the edge of the paper into the inside of the box during the operation of the third section or immediately thereafter.

74. The combination in a box machine of a main power shaft, a box forming wheel of relatively large diameter mounted thereon, three forming sections mounted on said forming wheel at equal distances from the center, the first of said sections being adapted to wrap a strip of paper around the side of a box, the second of said sections being adapted to turn up the edges of said strip of paper, the third of said sections being adapted to press one of said edges against the bottom of the box, each section being as long as the circumference of the box.

75. The combination in a box machine of a main power shaft, a box forming wheel mounted thereon, three forming sections mounted on said forming wheel, the first of said sections being adapted to wrap a strip of paper around the side of a box, the second of said sections being adapted to turn up the edges of said strip of paper, the third of said sections being adapted to press one of said edges against the bottom of the box, a divided box form in contact with said forming wheel and coöperating therewith to join together the parts of a box, one of the parts of said box form being withdrawn before the operation of the second section of the forming wheel on the box, said part being pressed forward during the operation of the third section on the box for the purpose of tucking the wrapping paper into the open end of the box.

76. The combination in a box machine of a main power shaft, a box forming wheel mounted thereon, three forming sections mounted on said forming wheel, the first of said sections being adapted to wrap a strip of paper around the side of a box, the second of said sections being adapted to turn up the edges of said strip of paper, the third of said sections being adapted to press one of said edges against the bottom of the box, a divided box form in contact with said forming wheel and coöperating therewith to join together the parts of a box, one of the parts of said box form being withdrawn before the operation of the second section of the forming wheel on the box, said part being pressed forward during the operation of the third section on the box for the purpose of tucking the wrapping paper into the open end of the box, a presser foot coöperating with the box form to hold the box in position during the withdrawal and the forward movement of the part of the box form.

77. In a box machine, the combination of a continuously revolving main power shaft, a forming wheel mounted thereon, an auxiliary power shaft having two box forms mounted thereon, a clutch for driving said auxiliary power shaft from said main power shaft, said clutch driving said auxiliary power shaft through a half revolution at substantially the same angular velocity as the main power shaft, permitting said auxiliary power shaft to remain at rest during the other half of the revolution of the main power shaft.

78. In a box machine, the combination of a continuously revolving main power shaft, a forming wheel mounted thereon, an auxiliary power shaft having two box forms mounted thereon, a clutch for driving said auxiliary power shaft from said main power shaft, said clutch driving said auxiliary power shaft through a half revolution at substantially the same angular velocity as the main power shaft, permitting said auxiliary power shaft to remain at rest during the other half of the revolution of the main power shaft, said clutch operating to cause the auxiliary power shaft to complete its revolution during the first half of the next revolution of the main power shaft, permitting the auxiliary power shaft to remain idle while the main power shaft completes its revolution.

79. In a box machine, the combination of a continuously revolving main power shaft, a forming wheel mounted thereon, an auxiliary power shaft having two box forms mounted thereon, a clutch for driving said auxiliary power shaft from said main power shaft, said clutch driving said auxiliary power shaft through a half revolution at substantially the same angular velocity as the main power shaft, permitting said auxiliary power shaft to remain at rest during the other half of the revolution of the main power shaft, said clutch operating to cause the auxiliary power shaft to complete its revolution during the first half of the next revolution of the main power shaft, permitting the auxiliary power shaft to remain idle while the main power shaft completes its revolution, one of said box forms being held in contact with said forming wheel while the auxiliary power shaft is idle, said box form being moved away from said forming wheel while the other box form is moving to contact with it during the rotation of said auxiliary power shaft.

80. In a box machine, the combination of a continuously revolving main power shaft, a forming wheel mounted thereon, an auxiliary power shaft having two box forms mounted thereon, a clutch for driving said auxiliary power shaft from said main power shaft, said clutch driving said auxiliary power shaft through a half revolution at substantially the same angular velocity as the main power shaft, permitting said auxiliary power shaft to remain at rest during the other half of the revolution of the main power shaft, said clutch operating to cause the auxiliary power shaft to complete its revolution during the first half of the next revolution of the main power shaft, permitting the auxiliary power shaft to remain idle while the main power shaft completes its revolution, one of said box forms being held in contact with said forming wheel while the auxiliary power shaft is idle, said box form being moved away from said forming wheel while the other box form is moving to contact with it during the rotation of said auxiliary power shaft, means for locking said auxiliary power shaft in position with one or the other of said box forms, in contact with said forming wheel.

81. In a box machine, the combination of a main power shaft having a forming wheel thereon, an auxiliary power shaft having a plurality of box forms thereon, means for rotating said auxiliary power shaft independently to bring said box forms successively into contact with said forming wheel, a plurality of cams and recesses carried on said auxiliary power shaft to hold said box forms in contact with said forming wheel, a friction brake for engaging with said cams to stop the revolution of said auxiliary power shaft, a spring pressed locking pin engaging with said recesses to lock said auxiliary power shaft against rotation, a cam on the main power shaft, connections between said cam and said locking pin for moving said locking pin, leaving said auxiliary power shaft free to rotate.

82. In a box machine, the combination of a main power shaft, a forming wheel mounted thereon, a box form mounted to rotate in contact therewith, a feeding plate carrying a strip of gummed paper adapted to insert the end of said paper between the forming wheel and said box form, permitting the feed of said paper around said box form, means for carrying said feed plate toward and away from the forming wheel and box form, a knife on the forming wheel for cutting off a predetermined length of said paper, said means operating to move said feeding plate away after the operation of said knife.

83. In a box machine, the combination of a forming wheel, a knife mounted thereon and operating at a predetermined point on the rotation of the forming wheel, a feed plate coöperating therewith, said feed plate carrying a strip of paper thereon, said paper normally projecting a slight distance beyond said feed plate, a box form rotating in contact with said forming wheel and adapted to contact with the projecting end of said paper and draw it forward over said feed plate.

84. In a box machine, the combination of a shaft, a pair of box forms mounted thereon, an ejector clamped to said shaft and having an arm thereon for each of said box forms, each of said arms terminating in a pair of curved fingers that embrace the box form, said curved fingers being movable along said box form for the purpose of engaging with the finished box thereon and stripping it therefrom.

85. The combination in a box machine of an ejector comprising two similar blocks, each having an arm overlapping the other, embracing a circular recess between them, an arm pivoted on each of said blocks, each of said arms terminating in a pair of curved fingers.

86. The combination in a box machine of an ejector comprising two similar blocks, each having an arm overlapping the other, embracing a circular recess between them, an arm pivoted on each of said blocks, each of said arms terminating in a pair of curved fingers, an arm extending laterally from each of said arms and carrying a pivotally mounted disk having a lug projecting therefrom, a pin for limiting the rotation of said disk in one direction and a torsion spring for holding said disk against said pin.

87. The combination in a box machine of an ejector comprising two similar blocks, each having an arm overlapping the other, embracing a circular recess between them, an arm pivoted on each of said blocks, each of said arms terminating in a pair of curved fingers, an arm extending laterally from each of said arms and carrying a pivotally mounted disk having a lug projecting therefrom, a pin for limiting the rotation of said disk in one direction and a torsion spring for holding said disk against said pin, an arm mounted to move against said lug and turn said disk on its bearing when moving in one direction, and to engage said lug and rock the arms of said ejector when moved in the reverse direction.

88. In a box machine, the combination of a frame, a box form mounted on said frame, an ejector having a pair of arms capable of movement along said box form, a presser foot coöperating with said box form and having an arm thereon which passes into engagement with said ejector when moved in one direction without disturbing the position of said ejector, said arm causing said ejector to rock when it is moved in the reverse direction for the purpose of stripping a finished box off of said box form.

89. In a box machine, the combination of a frame, a box form mounted on said frame, an ejector having a pair of arms capable of movement along said box form, a presser foot coöperating with said box form and having an arm thereon which passes into engagement with said ejector when moved in one direction without disturbing the position of said ejector, said arm causing said ejector to rock when it is moved in the reverse direction for the purpose of stripping a finished box off of said box form, a spring for returning said ejector to its normal position after said arm has passed out of engagement with said ejector.

90. In a box machine the combination of a box form comprising a pair of parallel disks, a shaft on which one of said disks is rigidly mounted, the second disk being mounted to slide on said shaft and having a radially projecting flange at the rear edge thereof, means for holding said disks together while a box ring is received thereon and connected to a box head, means for subsequently separating said disks and bringing them together again to finish the open end of the box.

91. In a box machine, the combination of a forming wheel having a series of differently shaped forming sections thereon arranged in a series on the periphery of said wheel, said forming sections occupying only a portion of the circumference of said wheel leaving a blank space on the periphery of said wheel between the beginning and end of said forming sections.

92. The combination in a box machine of a centering device comprising a cone shaped head, said head being made in sections, one of said sections telescoping within the other section, a stripper working along the outer section.

In testimony whereof we affix our signatures in presence of two witnesses.

THOMAS JAMES CLARKE.
ARMAND ILLY.

Witnesses:
WILLIAM KOEHL,
LOYE T. DURAND.